United States Patent
Grier et al.

(10) Patent No.: US 11,948,302 B2
(45) Date of Patent: Apr. 2, 2024

(54) AUTOMATED HOLOGRAPHIC VIDEO MICROSCOPY ASSAY

(71) Applicants: NEW YORK UNIVERSITY, New York, NY (US); SPHERYX, INC., New York, NY (US)

(72) Inventors: David G. Grier, New York, NY (US); Fook Chiong Cheong, Brooklyn, NY (US); Kaitlynn Snyder, New York, NY (US); Rushna Quddus, New York, NY (US); Lauren E. Altman, New York, NY (US); Kent Kirshenbaum, New York, NY (US)

(73) Assignees: New York University, New York, NY (US); Spheryx, Inc, New York, NY (US)

( * ) Notice: Subject to any disclaimer, the term of this patent is extended or adjusted under 35 U.S.C. 154(b) by 400 days.

(21) Appl. No.: 17/196,895

(22) Filed: Mar. 9, 2021

(65) Prior Publication Data
US 2021/0279876 A1    Sep. 9, 2021

Related U.S. Application Data

(60) Provisional application No. 62/987,223, filed on Mar. 9, 2020.

(51) Int. Cl.
*G06T 7/00*     (2017.01)
*G01N 15/1434*  (2024.01)
(Continued)

(52) U.S. Cl.
CPC ....... *G06T 7/0014* (2013.01); *G01N 15/1434* (2013.01); *G02B 21/365* (2013.01);
(Continued)

(58) Field of Classification Search
CPC ......... G06T 7/0012; G06T 2207/10056; G06T 2207/30004; G06T 2207/30024;
(Continued)

(56) References Cited

U.S. PATENT DOCUMENTS 3,069,654 A    12/1962   Hough
3,551,018 A    12/1970   Stetson
(Continued)

FOREIGN PATENT DOCUMENTS

CA    1159674 A1    1/1984
CN    1886684 A     12/2006
(Continued)

OTHER PUBLICATIONS

Van Oostrum, "Using Light Scattering to Track, Characterize and Manipulate Colloids," Utrecht University Repository, PHD Thesis, 321 pages (2011).
(Continued)

*Primary Examiner* — Ajibola A Akinyemi
(74) *Attorney, Agent, or Firm* — Foley & Lardner LLP

(57) ABSTRACT

An in-line holographic microscope can be used to analyze a video stream to track individual colloidal particles' three-dimensional motions. The system and method can provide real time nanometer resolution, and simultaneously measure particle sizes and refractive indexes. An assay using the holographic microscope for holographic particle characterization directly detect viruses, antibodies and related targets binding to the surfaces of specifically functionalized micrometer-scale colloidal probe beads. The system detects binding of targets by directly measuring associated changes in the bead's diameter without the need for downstream labeling and analysis.

20 Claims, 16 Drawing Sheets

(51) Int. Cl.
  *G02B 21/36* (2006.01)
  *G03H 1/00* (2006.01)
  *G03H 1/04* (2006.01)
  *G06T 7/62* (2017.01)

(52) U.S. Cl.
  CPC ......... *G03H 1/0005* (2013.01); *G03H 1/0465* (2013.01); *G06T 7/62* (2017.01); *G01N 2015/1445* (2013.01); *G03H 2001/005* (2013.01); *G03H 2001/0471* (2013.01); *G03H 2210/55* (2013.01); *G03H 2222/13* (2013.01); *G03H 2222/34* (2013.01); *G06T 2207/10056* (2013.01); *G06T 2207/30024* (2013.01)

(58) Field of Classification Search
  CPC ... G06T 7/20; G06T 2207/10064; G06T 3/40; G06T 7/0014; G06T 7/62
  USPC ........................................................ 382/128
  See application file for complete search history.

(56) References Cited

U.S. PATENT DOCUMENTS

| | | | |
|---|---|---|---|
| 4,532,422 A | 7/1985 | Nomura et al. | |
| 4,540,285 A | 9/1985 | Amer | |
| 4,627,729 A | 12/1986 | Breuckmann et al. | |
| 4,740,079 A | 4/1988 | Koizumi et al. | |
| 4,986,659 A | 1/1991 | Bachalo | |
| 4,998,788 A | 3/1991 | Osakabe et al. | |
| 5,095,207 A | 3/1992 | Tong | |
| 5,146,086 A | 9/1992 | De et al. | |
| 5,373,727 A | 12/1994 | Heller et al. | |
| 5,796,498 A | 8/1998 | French | |
| 5,880,841 A | 3/1999 | Marron et al. | |
| 5,939,716 A | 8/1999 | Neal | |
| 6,055,106 A | 4/2000 | Grier et al. | |
| 6,097,488 A | 8/2000 | Grek et al. | |
| 6,214,560 B1 | 4/2001 | Yguerabide et al. | |
| 6,281,994 B1 | 8/2001 | Horikoshi et al. | |
| 6,424,677 B1 | 7/2002 | Moeller et al. | |
| 6,480,285 B1 | 11/2002 | Hill | |
| 6,507,839 B1 | 1/2003 | Ponte | |
| 6,519,033 B1 | 2/2003 | Quist et al. | |
| 6,624,940 B1 | 9/2003 | Grier et al. | |
| 6,680,798 B2 | 1/2004 | Kreuzer | |
| 6,710,874 B2 | 3/2004 | Mavliev | |
| 6,797,942 B2 | 9/2004 | Grier et al. | |
| 6,815,664 B2 | 11/2004 | Wang et al. | |
| 6,850,363 B1 | 2/2005 | Wendenburg et al. | |
| 6,858,833 B2 | 2/2005 | Curtis et al. | |
| 6,977,767 B2 | 12/2005 | Sarychev et al. | |
| 6,995,351 B2 | 2/2006 | Curtis et al. | |
| 7,001,721 B1 | 2/2006 | Whitcombe et al. | |
| 7,109,473 B2 | 9/2006 | Grier et al. | |
| 7,133,203 B2 | 11/2006 | Grier et al. | |
| 7,161,140 B2 | 1/2007 | Grier et al. | |
| 7,218,112 B2 | 5/2007 | Ladebeck et al. | |
| 7,232,989 B2 | 6/2007 | Grier et al. | |
| 7,233,423 B2 | 6/2007 | Grier | |
| 7,248,282 B2 | 7/2007 | Maddison | |
| 7,276,170 B2 | 10/2007 | Oakey et al. | |
| 7,324,282 B2 | 1/2008 | Grier et al. | |
| 7,338,168 B2 | 3/2008 | Cartlidge et al. | |
| 7,351,953 B2 | 4/2008 | Grier et al. | |
| 7,473,890 B2 | 1/2009 | Grier et al. | |
| 7,482,577 B2 | 1/2009 | Gruber et al. | |
| 7,491,928 B2 | 2/2009 | Roichman et al. | |
| 7,515,953 B2 | 4/2009 | Madar et al. | |
| 7,532,327 B2 | 5/2009 | Bloom et al. | |
| 7,835,051 B2 | 11/2010 | Roichman et al. | |
| 7,839,551 B2 | 11/2010 | Lee et al. | |
| 7,869,011 B2 | 1/2011 | Christensen et al. | |
| 7,875,845 B2 | 1/2011 | Plewa et al. | |
| 7,908,300 B2 | 3/2011 | Stluka et al. | |
| 7,929,132 B2 | 4/2011 | Lupton et al. | |
| 8,059,321 B2 | 11/2011 | Roichman et al. | |
| 8,119,988 B2 | 2/2012 | Daido et al. | |
| 8,128,242 B2 | 3/2012 | Grier et al. | |
| 8,299,789 B2 | 10/2012 | Heid et al. | |
| 8,331,019 B2 | 12/2012 | Cheong et al. | |
| 8,405,395 B2 | 3/2013 | Setsompop et al. | |
| 8,431,884 B2 | 4/2013 | Grier | |
| 8,680,861 B1 | 3/2014 | Morrone | |
| 8,766,169 B2 | 7/2014 | Grier et al. | |
| 8,791,053 B2 | 7/2014 | Christensen et al. | |
| 8,791,985 B2 | 7/2014 | Grier et al. | |
| 9,176,152 B2 | 11/2015 | Knutson et al. | |
| 9,316,578 B2 | 4/2016 | Grier et al. | |
| 9,767,341 B2 | 9/2017 | Ozcan et al. | |
| 9,810,894 B2 | 11/2017 | Grier et al. | |
| 9,897,675 B2 | 2/2018 | Setsompop et al. | |
| 9,933,351 B2 | 4/2018 | Kent et al. | |
| 11,085,864 B2 | 8/2021 | Grier et al. | |
| 11,385,157 B2 | 7/2022 | Grier et al. | |
| 2002/0069242 A1 | 6/2002 | Berns | |
| 2003/0007894 A1 | 1/2003 | Wang et al. | |
| 2003/0021016 A1 | 1/2003 | Grier | |
| 2003/0021382 A1 | 1/2003 | Iwanczyk et al. | |
| 2003/0047676 A1 | 3/2003 | Grier et al. | |
| 2003/0089117 A1 | 5/2003 | Mao et al. | |
| 2003/0132373 A1 | 7/2003 | Curtis et al. | |
| 2004/0004716 A1 | 1/2004 | Mavliev | |
| 2004/0004717 A1 | 1/2004 | Reed | |
| 2004/0058455 A1 | 3/2004 | Grier et al. | |
| 2004/0072372 A1 | 4/2004 | Seul et al. | |
| 2004/0156098 A1 | 8/2004 | Dubois et al. | |
| 2004/0180363 A1 | 9/2004 | Gruber et al. | |
| 2004/0207922 A1 | 10/2004 | Grier et al. | |
| 2005/0017161 A1 | 1/2005 | Grier et al. | |
| 2005/0059846 A1 | 3/2005 | Kohda et al. | |
| 2005/0141757 A1 | 6/2005 | Ayache et al. | |
| 2005/0173622 A1 | 8/2005 | Curtis et al. | |
| 2005/0176134 A1 | 8/2005 | Grier et al. | |
| 2006/0003252 A1 | 1/2006 | Hirayama et al. | |
| 2006/0029634 A1 | 2/2006 | Berg et al. | |
| 2006/0127369 A1 | 6/2006 | Christensen et al. | |
| 2006/0131494 A1 | 6/2006 | Grier et al. | |
| 2006/0163463 A1 | 7/2006 | Grier | |
| 2007/0023622 A1 | 2/2007 | Grier et al. | |
| 2007/0070303 A1 | 3/2007 | Yonekubo | |
| 2007/0091442 A1 | 4/2007 | Macdonald et al. | |
| 2007/0177774 A1 | 8/2007 | Kuo | |
| 2007/0242269 A1 | 10/2007 | Trainer | |
| 2008/0037004 A1 | 2/2008 | Shamir et al. | |
| 2008/0094675 A1 | 4/2008 | Roichman et al. | |
| 2008/0100840 A1 | 5/2008 | Oma et al. | |
| 2008/0137161 A1 | 6/2008 | Roichman et al. | |
| 2008/0150532 A1 | 6/2008 | Slavin et al. | |
| 2008/0285099 A1 | 11/2008 | Knutson et al. | |
| 2009/0027747 A1 | 1/2009 | Lee et al. | |
| 2009/0059008 A1 | 3/2009 | Ishii | |
| 2009/0073563 A1 | 3/2009 | Betzig | |
| 2009/0079981 A1 | 3/2009 | Holve | |
| 2009/0128825 A1 | 5/2009 | Akcakir | |
| 2009/0132074 A1 | 5/2009 | Yamada | |
| 2009/0135432 A1 | 5/2009 | Betzig | |
| 2009/0170186 A1 | 7/2009 | Wu et al. | |
| 2010/0055031 A1 | 3/2010 | Ahn | |
| 2010/0090694 A1 | 4/2010 | Heid et al. | |
| 2010/0150408 A1 | 6/2010 | Ishikawa | |
| 2010/0172591 A1 | 7/2010 | Ishikawa | |
| 2010/0241357 A1 | 9/2010 | Chan et al. | |
| 2010/0253986 A1 | 10/2010 | Awatsuji et al. | |
| 2010/0259263 A1 | 10/2010 | Holland et al. | |
| 2011/0043607 A1 | 2/2011 | Grier et al. | |
| 2011/0071764 A1 | 3/2011 | Prather et al. | |
| 2011/0126914 A1 | 6/2011 | Hartman et al. | |
| 2011/0130348 A1 | 6/2011 | Ting et al. | |
| 2011/0157599 A1 | 6/2011 | Weaver et al. | |
| 2011/0176190 A1* | 7/2011 | Golan ................. | G03H 1/32 359/9 |
| 2011/0225196 A1 | 9/2011 | Haseyama | |
| 2011/0292363 A1 | 12/2011 | Ivey et al. | |

(56) References Cited

U.S. PATENT DOCUMENTS

| | | | |
|---|---|---|---|
| 2012/0038931 A1* | 2/2012 | Jourdain | G01N 21/45 356/518 |
| 2012/0135535 A1 | 5/2012 | Grier et al. | |
| 2012/0177543 A1 | 7/2012 | Battrell et al. | |
| 2012/0183947 A1 | 7/2012 | Mueth et al. | |
| 2012/0235678 A1 | 9/2012 | Seiberlich et al. | |
| 2012/0256626 A1 | 10/2012 | Adalsteinsson et al. | |
| 2012/0273664 A1 | 11/2012 | Grier et al. | |
| 2013/0038326 A1 | 2/2013 | Amadon et al. | |
| 2013/0271135 A1 | 10/2013 | Ozen et al. | |
| 2013/0278743 A1 | 10/2013 | Cheong et al. | |
| 2013/0308135 A1 | 11/2013 | Dubois et al. | |
| 2014/0148547 A1 | 5/2014 | Ishida et al. | |
| 2014/0170735 A1 | 6/2014 | Holmes | |
| 2014/0177932 A1 | 6/2014 | Milne et al. | |
| 2014/0253126 A1 | 9/2014 | Habara et al. | |
| 2014/0313510 A1 | 10/2014 | Schmidt et al. | |
| 2014/0333935 A1 | 11/2014 | Grier et al. | |
| 2015/0002150 A1 | 1/2015 | Weissler et al. | |
| 2015/0062587 A1 | 3/2015 | Shpaisman | |
| 2015/0300963 A1 | 10/2015 | Haidekker et al. | |
| 2015/0301141 A1 | 10/2015 | Griswold et al. | |
| 2015/0346300 A1 | 12/2015 | Setsompop et al. | |
| 2016/0116559 A1 | 4/2016 | Cohen | |
| 2016/0282436 A1 | 9/2016 | Cloos | |
| 2016/0291105 A1 | 10/2016 | Knoll et al. | |
| 2016/0291107 A1 | 10/2016 | Rosen et al. | |
| 2017/0209864 A1 | 7/2017 | Grisham et al. | |
| 2017/0357211 A1 | 12/2017 | Moon et al. | |
| 2018/0252628 A1 | 9/2018 | Ruffner et al. | |
| 2019/0033414 A1 | 1/2019 | Sofka et al. | |
| 2019/0033415 A1 | 1/2019 | Sofka et al. | |
| 2021/0123848 A1 | 4/2021 | Grier et al. | |
| 2021/0199552 A1 | 7/2021 | Van Oostrum et al. | |

FOREIGN PATENT DOCUMENTS

| | | |
|---|---|---|
| CN | 103238120 A | 8/2013 |
| CN | 105164508 A | 12/2015 |
| EP | 0 354 37 A1 | 9/1981 |
| EP | 0 278 714 A2 | 8/1988 |
| EP | 1 855 081 A1 | 11/2007 |
| EP | 1 865 430 A2 | 12/2007 |
| GB | 2 408 587 A | 6/2005 |
| JP | 55-096976 A | 7/1980 |
| JP | 03-251388 A | 11/1991 |
| JP | 03-251888 A | 11/1991 |
| JP | 2000-225302 A | 8/2000 |
| JP | 2001-034148 A | 2/2001 |
| JP | 2004-517742 A | 6/2004 |
| JP | 2005-512127 A | 4/2005 |
| JP | 2007-279475 A | 10/2007 |
| JP | 2011-502256 A | 1/2011 |
| JP | 2011-525967 A | 9/2011 |
| JP | 2012-515351 A1 | 7/2012 |
| JP | 2014-503794 A | 2/2014 |
| WO | WO-01/15288 A1 | 3/2001 |
| WO | WO-03/048868 A1 | 6/2003 |
| WO | WO-2005/027031 A2 | 3/2005 |
| WO | WO-2005/114151 A1 | 12/2005 |
| WO | WO-2006/034129 A2 | 3/2006 |
| WO | WO-2008/092107 A1 | 7/2008 |
| WO | WO-2008/127410 A2 | 10/2008 |
| WO | WO-2008/142560 A2 | 11/2008 |
| WO | WO-2009/059008 A1 | 5/2009 |
| WO | WO-2010/101671 A1 | 9/2010 |
| WO | WO-2012/061752 A2 | 5/2012 |
| WO | WO-2013/080164 A1 | 6/2013 |
| WO | WO-2013/126554 A1 | 8/2013 |
| WO | WO-2015/073894 A2 | 5/2015 |
| WO | WO-2015/200512 A1 | 12/2015 |
| WO | WO-2017/040158 A1 | 3/2017 |
| WO | WO-2021/249692 A1 | 12/2021 |
| WO | WO-2021/249693 A1 | 12/2021 |

OTHER PUBLICATIONS

Agarwal, et al., "Manipulation and assembly of nanowires with holographic optical traps," Optics Express 13(22), pp. 8906-8912 (2005).

Arlt, et al., "Optical micromanipulation using a Bessel light beam," Optics Communications 197(4-6), pp. 239-245 (2001).

Ashkin, "History of optical trapping and manipulation of small-neutral particle, atoms, and molecules," IEEE Journal of Selected Topics in Quantum Electronics 6(6), pp. 841-856 (2000).

Ashkin, "Optical trapping and manipulation of neutral particles using?lasers," Proceedings of the National Academy of Sciences 94(10), pp. 4853-4860 (1997).

Ashkin, et al, "Observation of as single-beam gradient force optical trap for dielectric particles," Optics Letters 11(5), pp. 288-290 (1986).

Biancaniello, et al., "Colloidal Interactions and Self-Assembly Using DNA Hybridization," Physical Review Letters 94(5):058302, 4 pages (2005).

Cizmar, et al., "Sub-micron particle organization by self-imaging of non-diffracting beams," New Journal of Physics 8(43), 23 pages (2006).

Crocker & Grier, "Microscopic measurement of the pair interaction potential of charge-stabilized colloid," Physical Review Letters 73(2), pp. 352-355 (1994).

Crocker, et al., "Entropic Attraction and Repulsion in Binary Colloids Probed with a Line Optical Tweezer," Physical Review Letters 82(21), pp. 4352-4355 (1999).

Curtis & Grier, "Modulated optical vortices," Optics Letters 28(11), pp. 872-874 (2003).

Curtis & Grier, "Structure of Optical Vortices," Physical Review Letters 90(13):133901, 4 pages (2003).

Curtis, et al., "Dynamic holographic optical tweezers," Optics Communications 207(1-6), pp. 169-175 (2002).

Duffy, et al., "Rapid Prototyping of Microfluidic Systems in Poly(dimethylsiloxane)," Analytical Chemistry 70(23), pp. 4974-4984 (1998).

Dufrense & Grier, "Optical tweezer arrays and optical substrates created with diffractive optics," Review of Scientific Instruments 69(5), pp. 1974-1977 (1998).

Dufresne, et al., "Computer-generated holographic optical tweezer arrays," Review of Scientific Instruments 72(3), pp. 1810-1816 (2001).

Eriksen, et al., "Fully dynamic multiple-beam optical tweezers," Optics Express 10(14), pp. 597-602 (2002).

Faucheux, et al., "Optical Thermal Ratchet," Physical Review Letters 74(9), pp. 1504-1507 (1995).

Faucheux, et al., "Periodic forcing of a Brownian particle," Physical Review E 51(6), pp. 5239-5250 (1995).

Gahagan & Swartzlander, "Optical vortex trapping of particles," Optics Letters 21(11), pp. 827-829 (1996).

Gleeson, et al., "Analytical approach to sorting in periodic and random potentials," Physical Review E 73(4):041102, 9 pages (2006).

Gopinathan & Grier, "Statistically Locked-In Transport through Periodic Potential Landscapes," Physical Review Letters 92(13):130602, 4 pages (2004).

Grier & Roichman, "Holographic optical trapping," Applied Optics 45(5), pp. 880-887 (2006).

Grier, "Optical tweezers in colloid and interface science," Current Opinion in Colloid & Interface Science 2(3), pp. 264-270 (1997).

He, et al., "Optical Particle Trapping with Higher-order Doughnut Beams Produced Using High Efficiency Computer Generated Holograms," Journal of Modern Optics 42(1), pp. 217-223 (1995).

Hermann, et al., "Separation of suspended patricles in microfluidic systems by directional-locking in periodic fields," Physical Review E 79(6):061404, 9 pages (2009).

Hirai, et al., "Laser Photophoresis of a Single Droplet in Oil in Water Emulsions," Langmuir 12(23), pp. 5570-5575 (1996).

Korda, et al., "Kinetically Locked-In Colloidal Transport in an Array of Optical Tweezers," Physical Review Letters 89(12):128301, 4 pages (2002).

(56) References Cited

OTHER PUBLICATIONS

Lacasta, et al., "Sorting mesoscopic particles driven through periodic potential landscapes," Modern Physics Letters B 20(23), pp. 1427-1442 (2006).
Ladavac, et al., "Sorting mesoscopic objects with periodic potential landscapes: Optical fractionation," Physical Review E 70(1):010901, 4 pages (2004).
Lee & Grier, "One-dimensional optical thermal ratchets," Journal of Physics: Condensed Matter 17(47), 7 pages (2005).
Lee & Grier, "Robustness of holographic optical traps against phase scaling errors," Optics Express 13(19), pp. 7458-7465 (2005).
Lee, et al., "Optical solenoid beams," Optics Express 18(7), pp. 6988-6993 (2010).
Liesner, et al., "Multi-functional optical tweezers using computer-generated holograms," Optics Communications 185(1-3), pp. 77-82 (2000).
MacDonald, et al., "Microfluidic sorting in an optical lattice," Letters to Nature 426, pp. 412-424 (2003).
Milne, et al., "Fractionation of polydisperse colloid with acousto-optically generated potential enery landscapes," Optics Letters 32(9), pp. 1144-1146 (2007).
Notice of Reasons for Rejection, JP Appl. No. 2012-546160, dated Sep. 3, 2013, 6 pages.
Pelton, et al., "Transport and fractionation in periodic potential-energy landscapes," Physical Review E 70(3):031108, 11 pages (2004).
Polin, et al., "Optimized holographic optical traps," Optics Express 13(15), pp. 5831-5845 (2005).
Rodrigo, et al., "Four-dimensional optical manipulation of colloidal particles," Applied Physics Letters 86(7):074103, 3 pages (2005).
Roichman, et al., "Colloidal transport through optical tweezer arrays," Physical Review E 75:011407, 4 pages (2007).
Roichman, et al., "Optical Forces Arising from Phase Gradients," Physical Review Letters 100:031602, 4 pages (2008).
Roichman, et al., "Optical traps with geometric aberrations," Applied Optics 45(15), pp. 3425-3429 (2006).
Roichman, et al., "Volumetric imaging of holographic optical traps," Optics Express 14(22), pp. 10907-10912 (2006).
Sancho, et al., "Particle separation by external fields on periodic surfaces," Journal of Physics: Condensed Matter 17, pp. SF4151-SF4163, (2005).
Sasaki, et al., "Pattern formation and flow control of fine particles by laser-scanning micromanipulation," Optics Letters 16(19), pp. 1463-1465 (1991).
Simpson, et al., "Optical tweezers and optical spanners with Laguerre-Gaussian modes," Journal of Modern Optics 43(122), pp. 2485-2491 (1996).
Sundbeck, et al., "Structure and scaling of helical modes of light," Optics Letters 30(5), pp. 477-479 (2005).
Svoboda & Block, "Biological Applications of Optical Forces," Annual Review of Biophysics and Biomolecular Structure 23(1), pp. 247-285 (1994).
Verma, et al., "Entropic Colloidal Interactions in Concentrated DNA Solutions," Physical Review Letters 81(18), pp. 4004-4007 (1998).
Xiao & Grier, "Sorting colloidal particles into multiple channels with optical forces: Prismatic optical fractionation," Physical Review E 82(5):051407, 9 pages (2010).
Yu, et al., "The manipulation and assembly of CuO nanorods with line optical tweezers," Nanotechnology 15(12), pp. 1732-1736 (2004).
Zhao, et al., "Recording and reconstruction of a color holographic image by using digital lensless Fourier transform holography," Optics Express 16(4), pp. 2514-2519 (2008).
Butime, et al., "Conoscopic holograms analysis using variations of the Hough transform," International Journal of Imaging Systems and Technology 19(1), pp. 10-13 (2009).
Allier, et al., "Label-free cell viability assay using lens-free microscopy," SPIE Proceedings 10497, 7 pages (2018).
Alm, et al., "Cells and Holograms—Holograms and Digital Holographic Microscopy as a Tool to Study the Morphology of Living Cells," Holography—Basic Principles and Contemporary Applications, pp. 335-351 (2013).
Arrizon, et al., "Accurate encoding of arbitrary complex fields with amplitude-only liquid crystal spatial light modulators," Optics Express 13(20), pp. 7913-7927 (2005).
Davis, et al., "Encoding amplitude and phase information onto a binary phase-only spatial light modulator," Applied Optics 42(11), pp. 2003-2008 (2003).
Davis, et al., "Encoding amplitude information onto phase-only filters," Applied Optics 38(23), pp. 5004-5013 (1999).
Feizi, et al., "Lensfree On-chip Microscopy Achieves Accurate Measurement of Yeast Cell Viability and Concentration Using Machine Learning," Conference on Lasers and Electro-Optics, ATh4B.4, 2 pages (2017).
Feizi, et al., "Rapid, portable and cost-effective yeast cell viability and concentration analysis using lensfree on-chip microscopy and machine learning," Lab on a Chip 16(22), pp. 4350-4358 (2016).
Huang, et al., "Optical tweezers as sub-pico-newton force transducers," Optics Communications 195(1-4), pp. 41-48 (2001).
Lee, et al., "Characterizing and tracking single colloidal particles with video holographic microscopy," Optics Express 15(26), pp. 18275-18282 (2007).
Moh, et al., "Multiple optical line traps using a single phase-only rectangular ridge," Applied Physics B 80(8), pp. 973-976 (2005).
Neuman & Block, "Optical trapping," Review of Scientific Instruments 75(9), pp. 2787-2809 (2004).
Pralle, et al., "Three-dimensional high-resolution particle tracking for optical tweezers by forward scattered light," Microscopy Research & Technique 44(5), pp. 378-386 (1999).
Seo, et al., "Lensfree holographic imaging for on-chip cytometry and diagnostics," Lab on a Chip 9(6), pp. 777-787 (2009).
Zhang, et al., "Reconstruction algorithm for high-numerical-aperture holograms with diffraction-limited resolution," Optics Letters 31(11), pp. 1633-1635 (2006).
"Immunogenicity Assessment for Therapeutic Protein Products," Food and Drug Administration, 39 pages (2014).
Aspnes, "Local-field effects and effective-medium theory: A microscopic perspective," American Journal of Physics 50(8), pp. 704-709 (1982).
Atherton & Kerbyson, "Size invariant circle detection," Image and Vision Computing 17(11), pp. 795-803 (1999).
Ball, et al., "Complexation Mechanism of Bovine Serum Albumin and Poly(allylamine hydrochloride)," The Journal of Physical Chemistry B 106(9), pp. 2357-2364 (2002).
Ballard, "Generalizing the Hough transform to detect arbitrary shapes," Pattern Recognition 13(2), pp. 111-122 (1981).
Basim & Moudgil, "Effect of Soft Agglomerates on CMP Slurry Performance," Journal of Colloid and Interface Science 256(1), pp. 137-142 (2002).
Basim, et al., "Effect of Particle Size of Chemical Mechanical Polishing Slurries for Enhanced Polishing with Minimal Defects," Journal of the Electrochemical Society 147(9), pp. 3523-3528 (2000).
Ben-Eliezer, et al., "A New Model-Based Technique for Accurate Reconstruction of T2 Relaxation Maps from Fast Spin-Echo Data," Proceedings of the International Society for Magnetic Resonance in Medicine 21, p. 2453 (2013).
Bishop, "Inverse problems," Neural Networks for Pattern Recognition, p. 207 (1995).
Boas, et al., "Scattering of diffuse photon density waves by spherical inhomogeneities within turbid media: analytic solution and applications," Proceedings of the National Academy of Sciences 91(11), pp. 4887-4891 (1994).
Bohren, et al., "Absorption and Scattering of Light by Small Particles," Wiley Interscience (1983).
Bolognesi, et al., "Digital holographic tracking of microprobes for multipoint viscosity measurements," Optics Express 19(20), pp. 19245-19254 (2011).
Bourquard, et al., "A practical inverse-problem approach to digital holographic reconstruction," Optics Express 23(3), pp. 3417-3433 (2013).

(56) References Cited

OTHER PUBLICATIONS

Carpenter, et al., "Overlooking subvisible particles in therapeutic protein products: Gaps that may compromise product quality," Journal of Pharmaceutical Sciences 98(4), pp. 1201-1205 (2009).
Chang & Lin, "LIBSVM: A library for support vector machines," ACM Transactions on Intelligent Systems and Technology 2(3), 27, 27 pages (2011).
Chang & Lin, "Training v-Support Vector Regression: Theory and Algorithms," Neural Computation 14(8), pp. 1959-1977 (2002).
Chen, et al., "Magnetic resonance fingerprinting (MRF) for rapid quantitative abdominal imaging," Proceedings of the International Society for Magnetic Resonance in Medicine 22, p. 0561 (2014).
Cheong & Grier, "Rotational and translational diffusion of copper oxide nanorods measured with holographic video microscopy," Optics Express 18(7), pp. 6555-6562 (2010).
Cheong, et al., "Flow visualization and flow cytometry with holographic video microscopy," Optics Express 17(15), pp. 13071-13079 (2009).
Cheong, et al., "Holographic characterization of colloidal particles in turbid media," Applied Physics Letters 111, 153702, 5 pages (2017).
Cheong, et al., "Holographic characterization of individual colloidal spheres' porosities," Soft Matter 7(15), pp. 6816-6819 (2011).
Cheong, et al., "Holographic microrheology of polysaccharides from *Streptococcus mutans* biofilms," Rheologica Acta 48(1), pp. 109-115 (2009).
Cheong, et al., "Strategies for three-dimensional particle tracking with holographic video microscopy," Optics Express 18(13), pp. 13563-13573 (2010).
Cheong, et al., "Technical note: Characterizing individual milk fat globules with holographic video microscopy," Journal of Dairy Science 92(1), pp. 95-99 (2009).
Chia, et al., "A Review of Analytical Techniques for Identifying Contaminants in the Semiconductor Industry," Journal of the IEST 45(1), pp. 37-44 (2002).
Cloos, et al., "Plug and Play Parallel Transmission at 7 and 9.4 Tesla Based on Principles from MR Fingerprinting," Proceedings of the International Society for Magnetic Resonance in Medicine 22, p. 0542 (2014).
Colomb, et al., "Polarization microscopy by use of digital holography: application to optical-fiber birefringence measurements," Applied Optics 44(21), pp. 4461-4469 (2005).
Costantino, et al., "Moisture-Induced Aggregation of Lyophilized Insulin," 11(1), pp. 21-29 (1994).
Crocker & Grier, "Methods of Digital Video Microscopy for Colloidal Studies," Journal of Colloid and Interface Science 179(1), pp. 298-310 (1996).
Demeule, et al., "Characterization of Particles in Protein Solutions: Reaching the Limits of Current Technologies," The AAPS Journal 12(4), pp. 708-715 (2010).
Den Engelsman, et al., "Strategies for the Assessment of Protein Aggregates in Pharmaceutical Biotech Product Development," Pharmaceutical Research 28(4), pp. 920-933 (2011).
Denis, et al., "Direct Extraction of the Mean Particle Size from a Digital Hologram," Applied Optics 45(5), pp. 944-952 (2006).
Dixon, et al., "Holographic deconvolution microscopy for high-resolution particle tracking," Optics Express 19(17), pp. 16410-16417 (2011).
Dixon, et al., "Holographic particle-streak velocimetry," Optics Express 19(5), pp. 4393-4398 (2011).
Doneva, et al., "Compressed Sensing Reconstruction for Magnetic Resonance Parameter Mapping," Magnetic Resonance in Medicine 64, pp. 1114-1120 (2020).
Dumm, "Characterization of low-level, oversize particles in abrasive powders," KONA Powder and Particle Journal 23, pp. 129-138 (2005).
Egorov, "Systematika, printsipy raboty i oblasty primeneniya datchikov (Systematics, the principle of operation and sensor applications)", Zhurnal radioelectoniki (Journal of Radio Electronics) 3, 22 pages (English abstract) (2009).

Examination Report for European Patent App. No. 08844591.1 dated Jan. 23, 2012, 6 pages.
Examination Report for European Patent App. No. 16169799.0, dated Jul. 24, 2017, 5 pages.
Extended European Search Report for European Patent App. No. 08844591.1 dated Nov. 5, 2011, 7 pages.
Extended European Search Report for European Patent App. No. 10749072.4, dated Feb. 15, 2018, 12 pages.
Extended European Search Report for European Patent App. No. 15152531.8, dated Mar. 20, 2015, 4 pages.
Extended European Search Report for European Patent App. No. 15792186.7, dated Dec. 14, 2017, 10 pages.
Extended European Search Report for European Patent App. No. 15811077.5, dated Apr. 12, 2018, 11 pages.
Extended European Search Report for European Patent App. No. 15858793.1, dated Jul. 11, 2018, 10 pages.
Extended European Search Report for European Patent App. No. 16169799.0, dated Aug. 18, 2016, 7 pages.
Extended European Search Report for European Patent App. No. 17750639.1 dated Jan. 16, 2020, 13 pages.
Farrando-Perez, et al., "Direct Measurement of Microporosity and Molecular Accessibility in Stober Spheres by Adsorption Isotherms," The Journal of Physical Chemistry C 122(38), pp. 22008-22017 (2018).
Feder, et al., "Scaling Behavior and Cluster Fractal Dimension Determined by Light Scattering from Aggregating Proteins," Physical Review Letters 53(15), pp. 1403-1406 (1984).
Fifth Office Action for Chinese Patent App. No. 201080009712.X, dated Mar. 11, 2015, 17 pages (with translation).
Filipe, et al., "Critical Evaluation of Nanoparticle Tracking Analysis (NTA) by NanoSight for the Measurement of Nanoparticles and Protein Aggregates," Pharmaceutical Research 27(5), pp. 796-810 (2010).
First Office Action in CN 201680062172.9, dated Nov. 18, 2019, 16 pages.
Fung & Hoang, "Assessing the Use of Digital Holographic Microscopy to Measure the Fractal Dimension of Colloidal Aggregates," Biophotonics Congress: Optics in the Life Sciences Congress, JT4A.19, 3 pages (abstract only) (2019).
Fung & Manoharan, "Holographic measurements of anisotropic three-dimensional diffusion of colloidal clusters," Physical Review E 88(2), 020302(R), 9 pages (2013).
Fung, et al., "Imaging multiple colloidal particles by fitting electromagnetic scattering solutions to digital holograms," Journal of Quantitative Spectroscopy and Radiative Transfer 113(18), pp. 2482-2489 (2012).
Fung, et al., "Measuring translational, rotational, and vibrational dynamics in colloids with digital holographic microscopy," Optics Express 19(9), pp. 8051-8065 (2011).
Goller, et al., "Inorganic "silicone oil" microgels," Colloids and Surfaces A: Physicochemical and Engineering Aspects 123-124, pp. 183-193 (1997).
Goodman, "Statistical Properties of Laser Speckle Patterns," Laser Speckle and Related Phenomena, pp. 9-75 (2007).
Graesslin, et al., "Fully Integrated Whole Body 3T MRI System for Parallel RF Transmission", Proceedings of the International Society for Magnetic Resonance in Medicine 15, p. 1007 (2007).
Graesslin, et al., "Whole Body 3T MRI System with Eight Parallel RF Transmission Channels," Proceedings of the International Society for Magnetic Resonance in Medicine 14, p. 129 (2006).
Grier, "A revolution in optical manipulation," Nature 424, pp. 810-816 (2003).
Grier, "Downloadable holographic microscopy software written in IDL, the Interactive Data Language," retrieved from http://physics.nyu.edu/grierlab/software.html, 3 pages (2014).
Hagiwara, et al., "Fractal Analysis of Aggregates Formed by Heating Dilute BSA Solutions Using Light Scattering Methods," Bioscience, Biotechnology, and Biochemistry 60(11), pp. 1757-1763 (1996).
Haist, et al., "Using Graphics Boards to Compute Holograms," Computing in Science & Engineering 8, pp. 8-13 (2006).
Hannel, et al., "Holographic characterization of imperfect colloidal spheres," Applied Physics Letters 107(14), 141905, 4 pages (2015).

(56) References Cited

OTHER PUBLICATIONS

Hillman, et al., "Microscopic particle discrimination using spatially-resolved Fourier-holographic light scattering angular spectroscopy," Optics Express 14(23), pp. 11088-11102 (2006).
Hogg, "Issues in Particle Size Analysis," KONA Powder and Particle Journal 26, pp. 81-93 (2008).
Hollitt, "A convolution approach to the circle Hough transform for arbitrary radius," Machine Vision and Applications 24(4), pp. 683-694 (2013).
Holm, et al., "Aggregation and fibrillation of bovine serum albumin," Biochimica et Biophysica Acta (BBA)—Proteins and Proteomics 1774(9), pp. 1128-1138 (2007).
Hukkanen & Braatz, "Measurement of particle size distribution in suspension polymerization using in situ laser backscattering," Sensors and Actuators B: Chemical 96(1-2), pp. 451-459 (2003).
International Search Report & Written Opinion for PCT/US2008/081794 dated Feb. 12, 2009, 5 pages.
International Search Report & Written Opinion for PCT/US2010/021045 dated Apr. 30, 2010, 6 pages.
International Search Report & Written Opinion for PCT/US2012/051542 dated Nov. 22, 2012, 6 pages.
International Search Report and Written Opinion for PCT/US2015/015666, dated Jan. 7, 2016, 11 pages.
International Search Report and Written Opinion for PCT/US2015/037472, dated Sep. 23, 2015, 9 pages.
International Search Report and Written Opinion for PCT/US2015/055154, dated Jan. 7, 2016, 11 pages.
International Search Report and Written Opinion for PCT/US2015/060183, dated Feb. 2, 2016, 9 pages.
International Search Report and Written Opinion for PCT/US2016/051946 dated Nov. 28, 2016, 7 pages.
International Search Report and Written Opinion for PCT/US2017/016857 dated Jun. 9, 2017, 13 pages.
International Search Report and Written Opinion for PCT/US2017/048496 dated Nov. 9, 2017, 10 pages.
Ishimaru, "Diffusion of light in turbid material," Applied Optics 28(12), pp. 2210-2215 (1989).
Jones, et al., "Silicone oil induced aggregation of proteins," Journal of Pharmaceutical Sciences 94(4), pp. 918-927 (2005).
Kao, et al., "Tracking of Single Fluorescent Particles in Three Dimensions: Use of Cylindrical Optics to Encode Particle Position," Biophysical Journal 67(3), pp. 1291-1300 (1994).
Kasimbeg, et al., "Holographic Characterization of Protein Aggregates in the Presence of Silicone Oil and Surfactants," Journal of Pharmaceutical Sciences 108(1), pp. 155-161 (2019).
Katscher, et al., "Parallel RF transmission in MRI", NMR in Biomedicine 19(3), pp. 393-400 (2006).
Katscher, et al., "RF Encoding Using a Multielement Parallel Transmit System," Magnetic Resonance in Medicine 63(6), pp. 1463-1470 (2010).
Knoll, et al., "Simultaneous MR-PET Reconstruction Using Multi Sensor Compressed Sensing and Joint Sparsity," Proceedings of the International Society for Magnetic Resonance in Medicine 22, p. 0082 (2014).
Kolomenkin, et al., "Geometric Voting Algorithm for Star Trackers," IEEE Transactions on Aerospace and Electronic Systems 44(2), 441-456 (2008).
Kosters, et al., "EMRECON: An Expectation Maximization Based Image Reconstruction Framework for Emission Tomography Data", 2011 IEEE Nuclear Science Symposium Conference Record, pp. 4365-4368 (2011).
Krishnatreya, et al., "Fast feature identification for holographic tracking: the orientation alignment transform," Optics Express 22(11), pp. 12773-12778 (2014).
Krishnatreya, et al., "Measuring Boltzmann's constant through holographic video microscopy of a single colloidal sphere," American Journal of Physics 82(23), pp. 23-31 (2014).
Lee, et al., "Holographic microscopy of holographically trapped three-dimensional structures", Optics Express 15(4), pp. 1505-1512 (2007).
Lee, et al., "Statistics of speckle propagation through the turbulent atmosphere," Journal of the Optical Society of America 66(11), pp. 1164-1172 (1976).
Li, et al., "Understanding Stober Silica's Pore Characteristics Measured by Gas Adsorption," Langmuir 31(2), pp. 824-832 (2015).
Ma, et al., "Magnetic resonance fingerprinting," Nature 495, pp. 187-193 (2013).
Malitson, "Interspecimen Comparison of the Refractive Index of Fused Silica," Journal of the Optical Society of America 55(10), pp. 1205-1209 (1965).
Maret & Wolf, "Multiple light scattering from disordered media. The effect of brownian motion of scatterers," Zeitschrift fur Physik B Condensed Matter 65(4), pp. 409-413 (1987).
Markel, "Introduction to the Maxwell Garnett approximation: tutorial," Journal of the Optical Society of America A 33(7), pp. 1244-1256 (2016).
Maschke, et al., "Micronization of Insulin by High Pressure Homogenization," Pharmaceutical Research 23(9), pp. 2220-2229 (2006).
Meakin, "Fractal Aggregates", Advances in Colloid and Interface Science 28, pp. 249-331 (1988).
Moreno, et al., "Particle positioning from charge-coupled device images by the generalized Lorenz-Mie theory and comparison with experiment," Applied Optics 39(28), pp. 5117-5124 (2000).
Moyses, et al., "Robustness of Lorenz-Mie microscopy against defects in illumination," Optics Express 21(5), pp. 5968-5973 (2013).
Mueller, et al., "The Alzheimer's Disease Neuroimaging Initiative," Neuroimaging Clinics of North America 15(4), pp. 869-877 (2005).
Nebrensky, et al., "A Particle Imaging and Analysis System for Underwater Holograms," Optical Methods and Data Processing in Heat and Fluid Flow, pp. 79-92 (2002).
Nelles, et al., "Dual-Source Parallel RF Transmission for Clinical MR Imaging of the Spine at 3.0 T: Intraindividual Comparison with Conventional Single-Source Transmission," Radiology 257(3), pp. 743-753 (2010).
Notice of Reasons for Refusal for Japanese Patent App. No. 2010-531335 dated Oct. 18, 2012, 6 pages (with translation).
Notice of Reasons for Refusal for Japanese Patent App. No. 2011-546331 dated Oct. 25, 2012, 6 pages (with translation).
Notice of Reasons for Refusal for Japanese Patent App. No. 2016-575179 dated Jan. 10, 2019, 9 pages (with translation).
Notice of Reasons for Refusal for Japanese Patent App. No. 2018-514278 dated Oct. 22, 2020, 9 pages (with translation).
Notification of Reason for Refusal for Korean Patent App. No. 10-2017-7002262 dated Jul. 17, 2020, 15 pages (with translation).
Obey & Vincent, "Novel Monodisperse "Silicone Oil"/Water Emulsions," Journal of Colloid and Interface Science 163(2), pp. 454-463 (1994).
Office Action for Chinese Patent App. No. 200880114008.3 dated Jul. 18, 2013, 25 pages (with translation).
Office Action for Chinese Patent App. No. 201410471610.X dated Mar. 22, 2016, 21 pages (with translation).
Omichi, et al., "Fabrication of enzyme-degradable and size-controlled protein nanowires using single particle nano-fabrication technique," Nature Communications 5, 3718, 8 pages (2014).
Orzada, et al., "Design and comparison of two eight-channel transmit/receive radiofrequency arrays for in vivo rodent imaging on a 7 T human whole-body MRI system," Medical Physics 37(5), pp. 2225-2232 (2010).
Pan, et al., "Three-Dimensional Particle Tracking for Dilute Particle-Liquid Flows in a Pipe," Measurement Science and Technology 13(8), pp. 1206-1216 (2002).
Panchal, et al., "Analyzing Subvisible Particles in Protein Drug Products: a Comparison of Dynamic Light Scattering (DLS) and Resonant Mass Measurement (RMM)," The AAPS Journal 16(3), pp. 440-451 (2014).
Parnell, et al., "Porosity of silica Stober particles determined by spin-echo small angle neutron scattering," Soft Matter 12, pp. 4709-4714 (2016).
Parthasarathy, "Rapid, accurate particle tracking by calculation of radial symmetry centers," Nature Methods 9, pp. 724-726 (2012).

(56) References Cited

OTHER PUBLICATIONS

Pawashe & Sitti, "Two-dimensional vision-based autonomous microparticle manipulation using a nanoprobe," Journal of Micromechatronics 3(3-4), pp. 285-306 (2006).
Pedregosa, et al., "Scikit-learn: Machine Learning in Python," Journal of Machine Learning Research 12, pp. 2825-2830 (2011).
Perry, et al., "Real-space studies of the structure and dynamics of self-assembled colloidal clusters," Faraday Discussions 159, pp. 211-234 (2012).
Pine, et al., "Diffusing wave spectroscopy," Physical Review Letters 60(12), pp. 1134-1137 (1988).
Quick, "Integrated PET/MR," Journal of Magnetic Resonance Imaging 39(2), pp. 243-258 (2014).
Rappaz, et al., "Erythrocytes volume and refractive index measurement with a Digital Holographic Microscope," Proceedings of SPIE—The International Society for Optical Engineering 6445, 644509, 5 pages. (2007).
Rappaz, et al., "Simultaneous cell morphometry and refractive index measurement with dual-wavelength digital holographic microscopy and dye-enhanced dispersion of perfusion medium," Optics Letters 33(7), pp. 744-746 (2008).
Remsen, et al., "Analysis of Large Particle Count in Fumed Silica Slurries and Its Correlation with Scratch Defects Generated by CMP," Journal of the Electrochemical Society 153(5), pp. G453-G461 (2006).
Ripple & Dimitrova, "Protein particles: What we know and what we do not know," Journal of Pharmaceutical Sciences 101(10), pp. 3568-3579 (2012).
Roichman, et al., "Influence of Nonconservative Optical Forces on the Dynamics of Optically Trapped Colloidal Spheres: The Fountain of Probability," Physical Review Letters 101, 128301, 5 pages (2008).
Rubinstein, et al., "Recognition of distorted patterns by invariance kernels," Pattern Recognition 24(10), pp. 959-967 (1991).
Savin & Doyle, "Role of a finite exposure time on measuring an elastic modulus using microrheology," Physical Review E 71, 041106, 6 pages (2005).
Savin & Doyle, "Static and Dynamic Errors in Particle Tracking Microrheology," Biophysical Journal 88(1), pp. 623-638 (2005).
Schellekens, "Bioequivalence and the immunogenicity of biopharmaceuticals," Nature Reviews Drug Discovery 1, pp. 457-462 (2002).
Sciammarella, et al., "Measuring Mechanical Properties of Materials in the Micron Range," Optical Engineering 42(5), 8 pages (2003).
Seifi, et al., "Fast and accurate 3D object recognition directly from digital holograms," Journal of the Optical Society of America A 30(11), pp. 2216-2224 (2013).
Sheng, et al., "Digital holographic microscope for measuring three-dimensional particle distributions and motions," Applied Optics 45(16), pp. 3893-3901 (2006).
Shpaisman, et al., "Holographic microrefractometer," Applied Physics Letters 101, 091102, 3 pages (2012).
Siler & Cornish, "Measurement of Protein in Natural Rubber Latex," Analytical Biochemistry 229(2), pp. 278-281 (1995).
Singh, et al., "An industry perspective on the monitoring of sub-visible particles as a quality attribute for protein therapeutics," Journal of Pharmaceutical Sciences 99(8), pp. 3302-3321 (2010).
Siposova, et al., "Depolymerization of insulin amyloid fibrils by albumin-modified magnetic fluid," Nanotechnology 23(5), 055101, 10 pages(2012).
Sluzky, et al., "Kinetics of insulin aggregation in aqueous solutions upon agitation in the presence of hydrophobic surfaces," Proceedings of the National Academy of Sciences 88(21), pp. 9377-9381 (1991).
Smola & Scholkopf, "A tutorial on support vector regression," Statistics and Computing 14(3), pp. 199-222 (2004).
Sorensen, "Light Scattering by Fractal Aggregates: A Review," Aerosol Science and Technology 35(2), pp. 648-687 (2001).
Strzodka, et al., "Real-Time Motion Estimation and Visualization on Graphics Cards," IEEE Visualization 2004, pp. 545-552 (2004).
Tolla & Boldridge, "Distortion of Single-Particle Optical Sensing (SPOS) Particle Count by Sub-Countable Particles," Particle & Particle Systems Characterizaion 27(1-2), pp. 21-31 (2010).
Voros, "The Density and Refractive Index of Adsorbing Protein Layers," Biophysical Journal 87(1), pp. 553-561 (2004).
Wang, "Protein aggregation and its inhibition in biopharmaceutics," International Journal of Pharmaceutics 289(1-2), pp. 1-30 (2005).
Wang, et al., "Celebrating Soft Matter's 10th Anniversary: Monitoring colloidal growth with holographic microscopy," Soft Matter 11(6), pp. 1062-1066 (2015).
Wang, et al., "Holographic characterization of colloidal fractal aggregates," Soft Matter 12(42), pp. 8774-8780 (2016).
Wang, et al., "Holographic characterization of protein aggregates," Journal of Pharmaceutical Sciences 105(3), pp. 1074-1085 (2016).
Wang, et al., "Stimulus-responsive colloidal sensors with fast holographic readout," Applied Physics Letters 107(5), 051903, 5 pages (2015).
Wang, et al., "Using the discrete dipole approximation and holographic microscopy to measure rotational dynamics of non-spherical colloidal particles," Journal of Quantitative Spectroscopy and Radiative Transfer 146, pp. 499-509 (2014).
Weber, et al., "A Novel 8-Channel Transceive vol. Array for a 9.4T Animal Scanner," Proceedings of the International Society for Magnetic Resonance in Medicine 16, p. 151 (2008).
Weinbuch, et al., "Micro-Flow Imaging and Resonant Mass Measurement (Archimedes)—Complementary Methods to Quantitatively Differentiate Protein Particles and Silicone Oil Droplets," Journal of Pharmaceutical Sciences 102(7), pp. 2152-2165 (2013).
Witten & Sander, "Diffusion-Limited Aggregation, a Kinetic Critical Phenomenon," Physical Review Letters 47(19), pp. 1400-1403 (1981).
Written Opinion for Singapore Patent App. No. 11201802181R dated Mar. 28, 2019, 7 pages.
Wu, et al., "Synthesis of mesoporous silica nanoparticles," Chemical Society Reviews 42(9), pp. 3862-3875 (2013).
Xiao & Grier, "Multidimensional Optical Fractionation of Colloidal Particles with Holographic Verification," Physical Review Letters 104, 028302, 4 pages (2010).
Yang, et al., "Spatial coherence of forward-scattered light in a turbid medium," Journal of the Optical Society of America A 16(4), pp. 866-871 (1999).
Ye, et al., "Accelerating Magnetic Resonance Fingerprinting (MRF) Using t-Blipped Simultaneous Multislice (SMS) Acquisition," Magnetic Resonance in Medicine 75(5), pp. 2078-2085 (2016).
Yevick, et al., "Machine-learning approach to holographic particle characterization," Optics Express 22(22), pp. 26884-26890 (2014).
Yip, et al., "Atomic Force Microscopy of Crystalline Insulins: The Influence of Sequence Variation on Crystallization and Interfacial Structure," Biophysical Journal 74(5), pp. 2199-2209 (1998).
Yip, et al., "Structural and Morphological Characterization of Ultralente Insulin Crystals by Atomic Force Microscopy: Evidence of Hydrophobically Driven Assembly," Biophysical Journal 75(3), pp. 1172-1179 (1998).
Zolls, et al., "How subvisible particles become invisible-relevance of the refractive index for protein particle analysis," Journal of Pharmaceutical Sciences 102(5), pp. 1434-1446 (2013).
Altman & Grier, "Catch: Characterizing and Tracking Colloids Holographically Using Deep Neural Networks," The Journal of Physical Chemistry B 124(9), pp. 1602-1610 (2020).
Crocker & Grier, "Methods of Digital Video Microscopy for Colloidal Studies," Methods of Digital Video Microscopy for Colloidal Studies 179(1), pp. 298-310 (1996).
Daimon & Masumura, "Measurement of the refractive index of distilled water from the near-infrared region to the ultraviolet region," Applied Optics 46(18), pp. 3811-3820 (2007).
Dufresne, et al., "Brownian dynamics of a sphere between parallel walls," Europhysics Letters 53(2), pp. 264-270 (2001).
Fung & Hoang, "Computational assessment of an effective-sphere model for characterizing colloidal fractal aggregates with holographic microscopy," Journal of Quantitative Spectroscopy and Radiative Transfer 236:106591, 10 pages (2019).

(56) References Cited

OTHER PUBLICATIONS

Krishnatreya, et al., "Measuring Boltzmann's constant through holographic video microscopy of a single colloidal sphere," American Journal of Physics 82(1):23, 10 pages (2014).

Lin, et al., "Direct measurements of constrained Brownian motion of an isolated sphere between two walls," Physical Review E 62(3), pp. 3909-3919 (2000).

Lobry & Ostrowsky, "Diffusion of Brownian particles trapped between two walls: Theory and dynamic-light-scattering measurements," Physical Review B 53(18), pp. 12050-12056 (1996).

Odete, et al., "The role of the medium in the effective-sphere interpretation of holographic particle characterization data," Soft Matter 16(5), pp. 891-898 (2020).

Plumere, et al., "Stober silica particles as basis for redox modifications: Particle shape, size, polydispersity, and porosity," Journal of Colloid and Interface Science 368(1), pp. 208-219 (2012).

Power & De Power, "Second-Kind Integral Equation Formulation for the Slow Motion of a Particle of Arbitrary Shape Near a Plane Wall in a Viscous Fluid," SIAM Journal on Applied Mathematics 53(1), pp. 60-70 (1993).

Sohn, "Refractive Index of Porous Silicon," Handbook of Porous Silicon, pp. 231-243 (2014).

Xue, et al., "Diffusion, dispersion, and settling of hard spheres," Physical Review Letters 69(11), pp. 1715-1718 (1992).

Botstein & Fink, "Yeast: An Experimental Organism for 21st Century Biology," Genetics 189(3), pp. 695-704 (2011).

Chan, et al., "Morphological observation and analysis using automated image cytometry for the comparison of trypan blue and fluorescence-based viability detection method," Cytotechnology 67, pp. 461-473 (2014).

Chan, et al., "Observation and quantification of the morphological effect of trypan blue rupturing dead or dying cells," PLoS ONE 15(1): e0227950, 17 pages (2020).

Cheong, et al., "Rapid, High-Throughput Tracking of Bacterial Motility in 3D via Phase-Contrast Holographic Video Microscopy," Biophysical Journal 108(5), pp. 1248-1256 (2015).

Cuche, et al., "Simultaneous amplitude-contrast and quantitative phase-contrast microscopy by numerical reconstruction of Fresnel off-axis holograms," Applied Optics 38(34), pp. 6994-7001 (1999).

Duina, et al., "Budding Yeast for Budding Geneticists: A Primer on the *Saccharomyces cerevisiae* Model System," Genetics 197(1), pp. 33-48 (2014).

Ferreira, et al., "Tackling Cancer with Yeast-Based Technologies," Trends in Biotechnology 37(6), pp. 592-603 (2019).

Fleet, "Yeasts in foods and beverages: impact on product quality and safety," Current Opinion in Biotechnology 18(2), pp. 170-175 (2007).

Gabor, "A New Microscopic Principle," Nature 161, pp. 777-778 (1948).

Gibson, et al., "Yeast responses to stresses associated with industrial brewery handling," FEMS Microbiology REviews 31(5), pp. 535-569 (2007).

Gomes, et al., "Comparison of Yeasts as Hosts for Recombinant Protein Production," Microorganisms 6(2):38, 23 pages (2018).

Gorbenko, et al., "Quantification of changes in cellular morphology during cell necrosis obtained from 3D refractive index distributions," Journal of Physics: Conference Series 1236:012015, 6 pages (2019).

Guaragnella, et al., "The expanding role of yeast in cancer research and diagnosis: insights into the function of the oncosuppressors p53 and BRCA1/2," FEMS Yeast Research 14(1), pp. 2-16 (2014).

Huang, et al., "Efficient protein production by yeast requires global tuning of metabolism," Nature Communications 8:1131, 12 pages (2017).

Kim, et al., "Yeast synthetic biology for the production of recombinant therapeutic proteins," FEMS Yeast Research 15(1), pp. 1-16 (2015).

Kwolek-Mirkek & Zadrag-Tecza, "Comparison of methods used for assessing the viability and vitality of yeast cells," FEMS Yeast Research 14(7), pp. 1068-1079 (2014).

Lodolo, et al., "The yeast *Saccharomyces cerevisiae*—the main character in beer brewing," FEMS Yeast Research 8(7), pp. 1018-1036 (2008).

Maicas, "The Role of Yeasts in Fermentation Processes," Microorganisms 8(8):1142, 8 pages (2020).

Markel, et al., "Introduction to the Maxwell Garnett approximation: tutorial," Journal of the Optical Society of America A 33(7), pp. 1244-1256 (2016).

Mascotti, et al., "HPC viability measurement: trypan blue versus acridine orange and propidium iodide," Transfusion 40(6), pp. 693-696 (2000).

Mernier, et al., "Cell viability assessment by flow cytometry using yeast as cell model," Sensors & Actuators B: Chemical 154(2), pp. 160-163 (2011).

Midtvedt, et al., "Label-free spatio-temporal monitoring of cytosolic mass, osmolarity, and volume in living cells," Nature Communications 10:340, 9 pages (2019).

Odete, et al., "The role of the medium in the effective-sphere interpretation of holographic particle characterization data," Soft Matter 16(4), pp. 891-898 (2019).

Odumeru, et al., "Effects of heat shock and ethanol stress on the viability of a *Saccharomyces uvarum* (carlsbergensis) brewing yeast strain during fermentation of high gravity wort," Journal of Industrial Microbiology 10(2), pp. 111-116 (1992).

Ovryn & Izen, "Imaging of transparent spheres through a planar interface using a high-numerical-aperture optical microscope," Journal of the Optical Society of America A 17(7), pp. 1202-1213 (2000).

Parapouli, et al., "*Saccharomyces cerevisiae* and its industrial applications," AIMS Microbiology 6(1), pp. 1-31 (2020).

Philips, et al., "Holographic characterization of contaminants in water: Differentiation of suspended particles in heterogeneous dispersions," Water Research 122, pp. 431-439 (2017).

Pratt, et al., "The Effects of Osmotic Pressure and Ethanol on Yeast Viability and Morphology," Journal of the Institute of Brewing 109(3), pp. 218-228 (2003).

Pray, "L. H. Hartwell's Yeast: A Model Organism for Studying Somatic Mutations and Cancer," Nature Education 1(1), 3 pages (2008).

Rommel, et al., "Contrast-enhanced digital holographic imaging of cellular structures by manipulating the intracellular refractive index," Journal of Biomedical Optics 15(4):041509, 10 pages (2010).

Schnars & Juptner, "Direct recording of holograms by a CCD target and numerical reconstruction," Applied Optics 33(2), pp. 179-181 (1994).

Tennant, "Evaluation of the Trypan Blue Technique for Determination of Cell Viability," Transplantation 2(6), pp. 685-694 (1964).

Winters, et al., "Quantitative Differentiation of Protein Aggregates From Other Subvisible Particles in Viscous Mixtures Through Holographic Characterization," Journal of Pharmaceutical Sciences 109(8), pp. 2405-2412 (2020).

Xu, et al., "Digital in-line holography of microspheres," Applied Optics 41(25), pp. 5367-5375 (2002).

\* cited by examiner

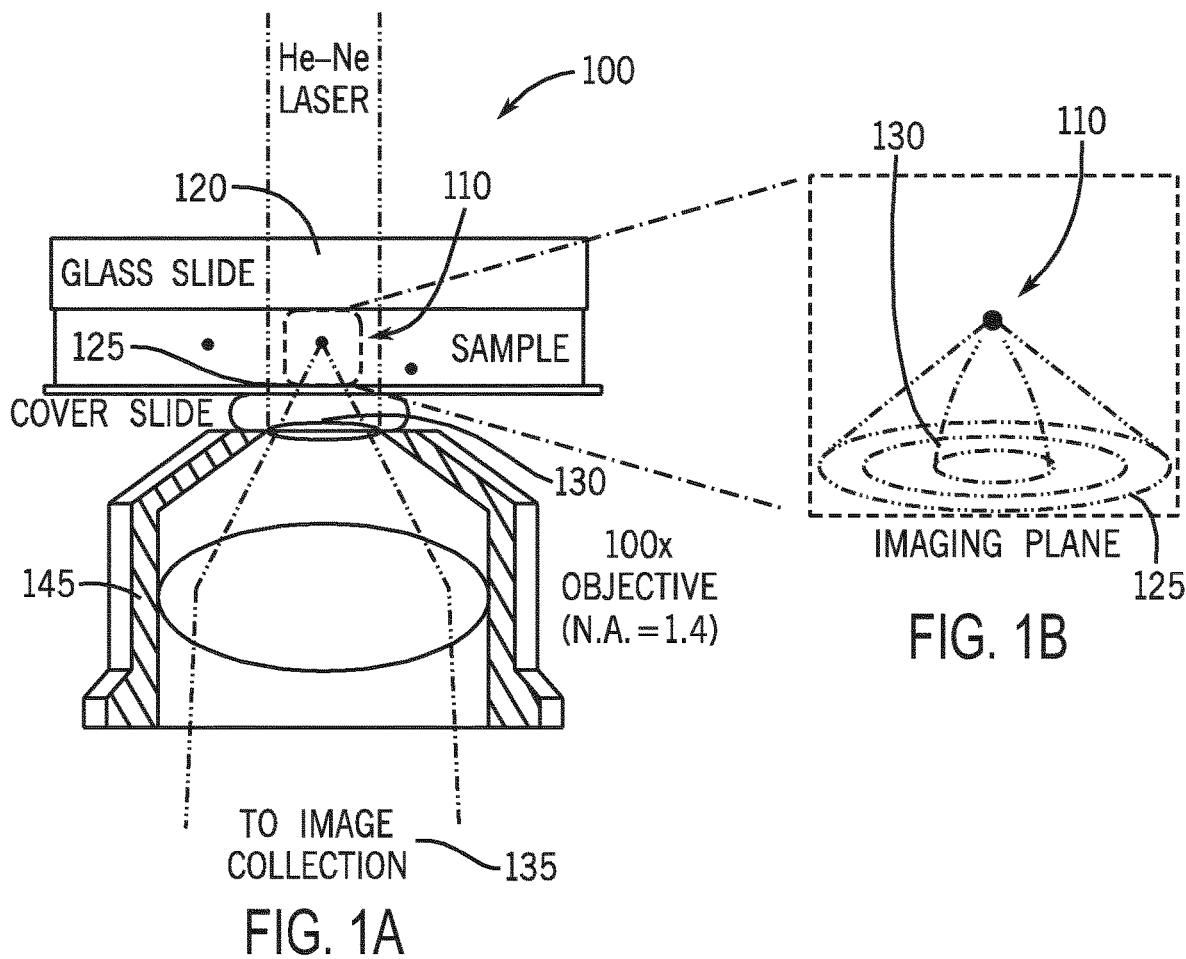
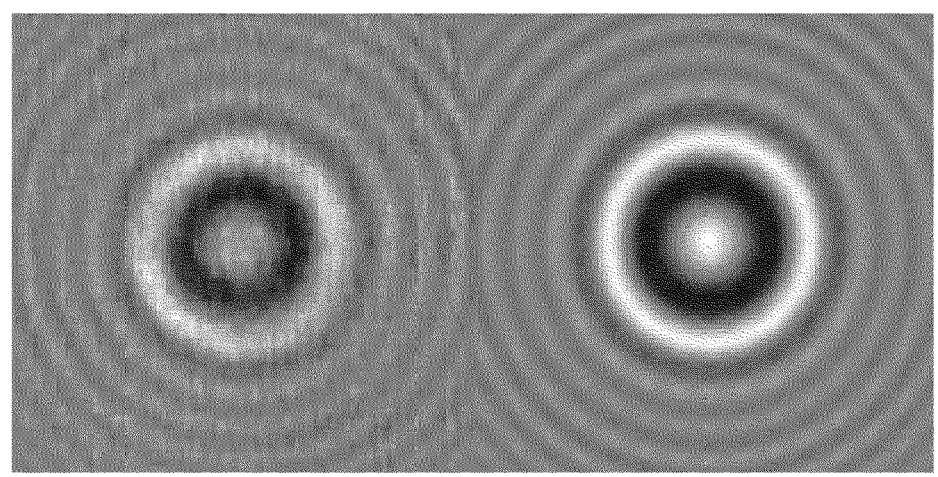
Optical  Fitted
FIG. 1C(1)  FIG. 1C(2)

FIG. 6(A)(1)
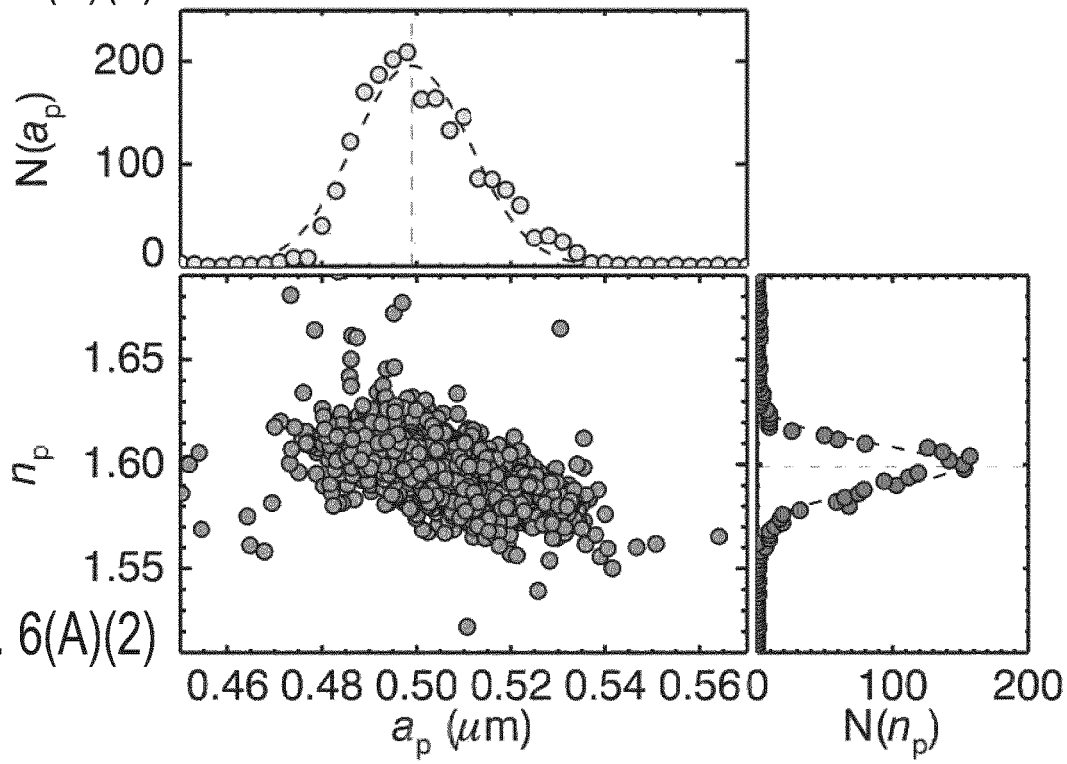
FIG. 6(A)(2)
FIG. 6(A)(3)
FIG. 6(B)(1)
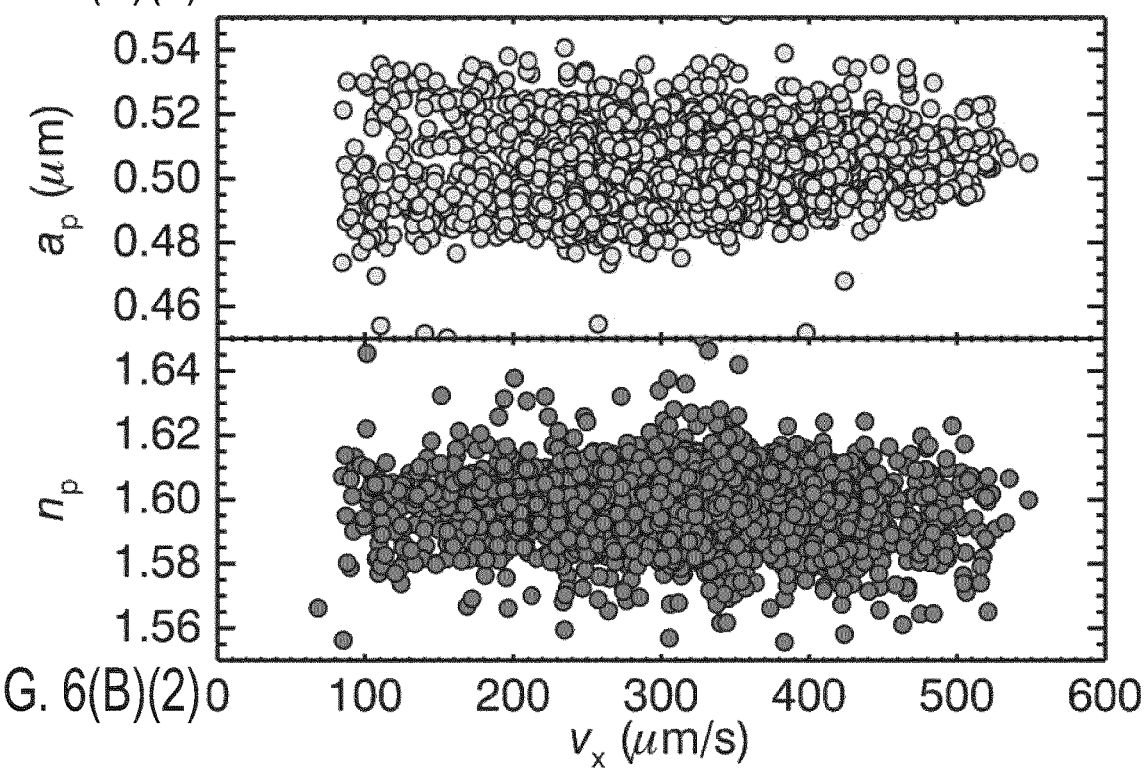
FIG. 6(B)(2)

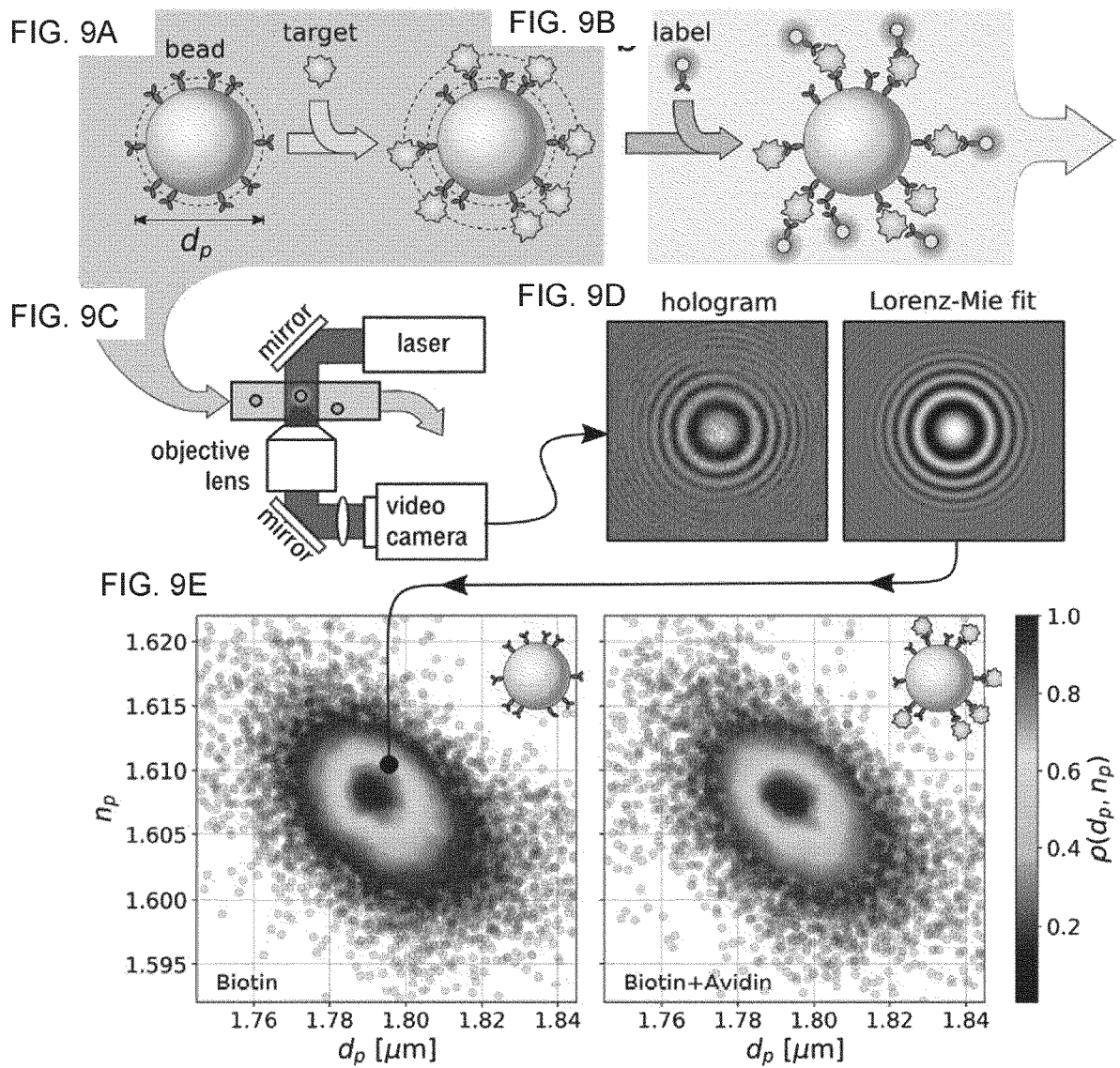

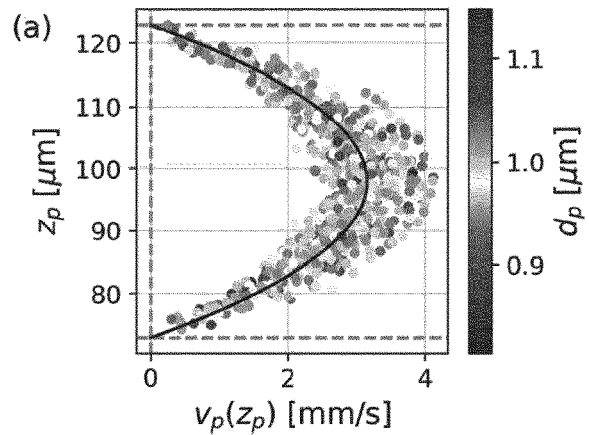 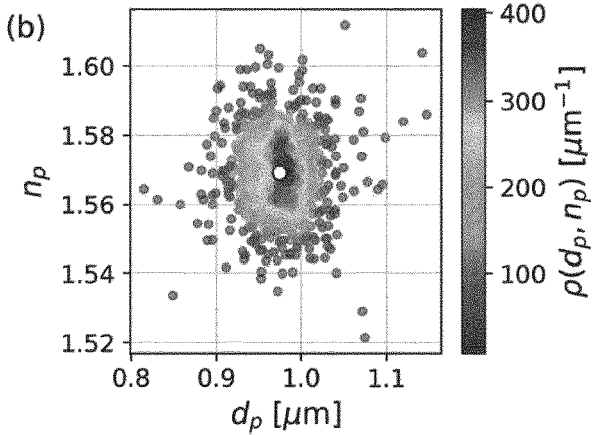
FIG. 12A  FIG. 12B
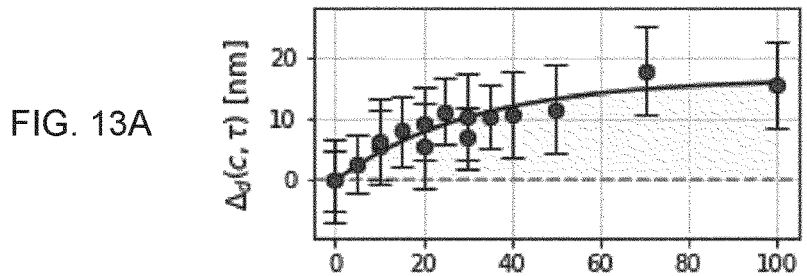
FIG. 13A
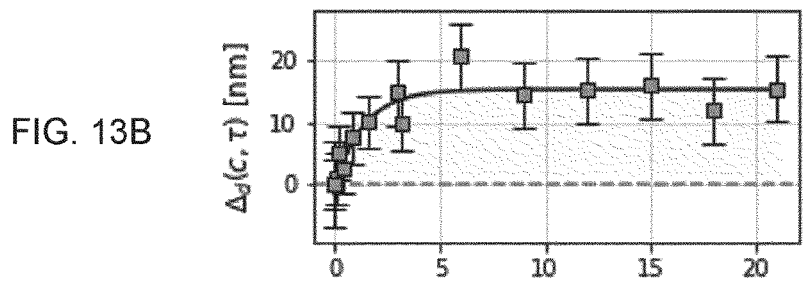
FIG. 13B
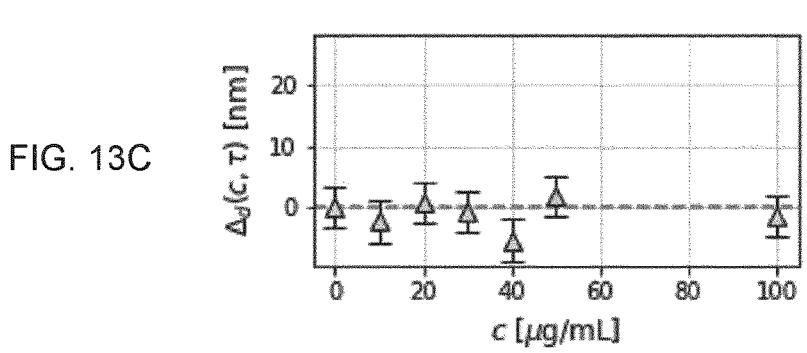
FIG. 13C

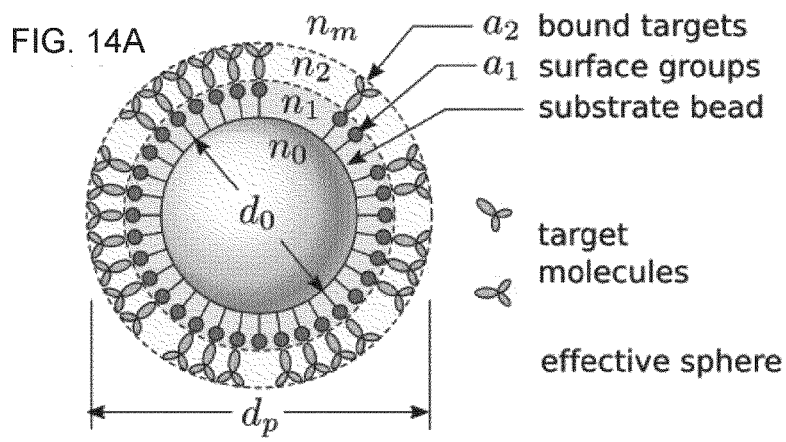
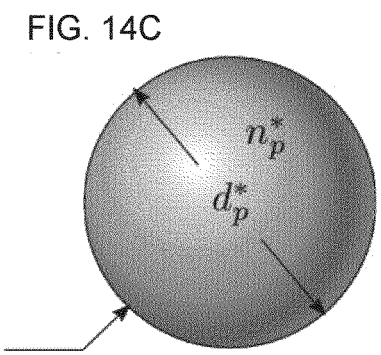
FIG. 14A
FIG. 14C
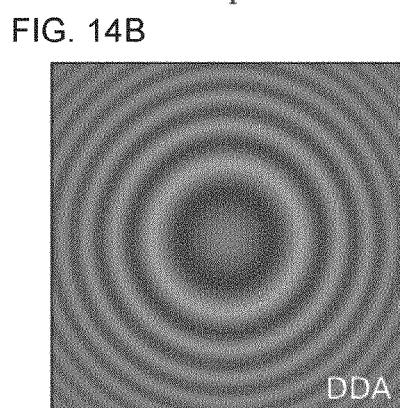
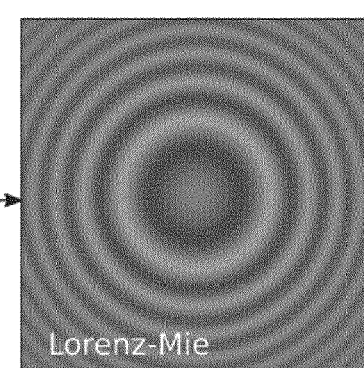
FIG. 14B
FIG. 14D
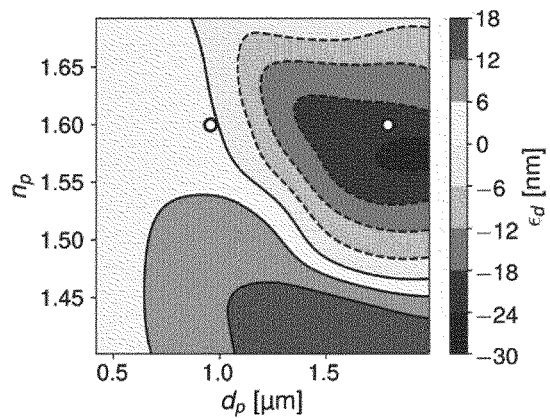
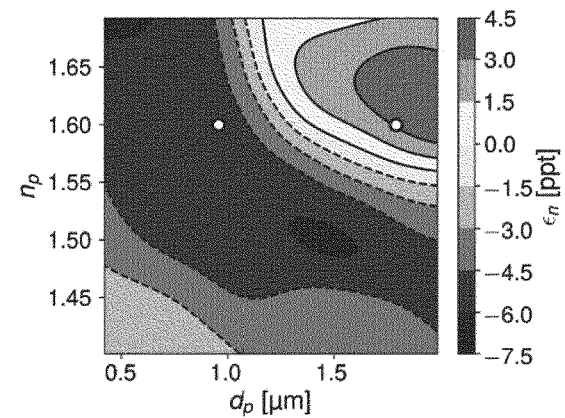
FIG. 15A
FIG. 15B

AUTOMATED HOLOGRAPHIC VIDEO MICROSCOPY ASSAY

CROSS-REFERENCE TO RELATED APPLICATIONS

The present application claims the benefit of and priority to U.S. Provisional Patent Application 62/987,223 filed Mar. 9, 2020, which is incorporated by reference herein in its entirety.

STATEMENT OF GOVERNMENT INTEREST

This invention was made with government support under Grant No. DMR-1420073 awarded by the National Science Foundation. The government has certain rights in the invention.

BACKGROUND OF THE INVENTION

The characterization of colloidal particles, particularly spheres, is an important and pervasive issue in many aspects of industrial chemical, physical and biomedical applications. A variety of important functionalities are being sought to perform various characterizations including: 1) bead based molecular binding assays, 2) flow field measurements, 3) automated particle image detection in holograms, and 4) real time analysis of particle features. For example, coherent illumination traditionally has not been used widely for particle image velocimetry because the resulting holographic images can be difficult to interpret quantitatively. Consequently, measurements of fluorescence yield have been used to carry out bead-based molecular binding assays in conventional fluorescence microscopy measurements of molecular binding.

However, such methods require fluorescent labeling with conventional assays requiring tens of thousands of beads to eliminate artifacts to non-specific fluorophore binding and unintentional bleaching. It has been recently demonstrated that holographic video microscopy images of colloidal particles can be used to locate the particles' centers in three dimensions, even when particles occlude each other along the optical axis. Earlier demonstrations using phenomenological models for the observed scattering patterns achieved tracking resolution comparable to that attained with conventional particle imaging methods. The principal benefit of coherent illumination in these studies was the greatly extended working distance and depth of focus compared with conventional imaging methods.

However, these methods are inefficient, do not allow any real time analysis to be performed and cannot even perform a number of characterizations (such as the four listed above). Further, viral assays and similar assays may rely upon a probe bead that binds with a target material such as a viral protein. The result of such, particularly in real-world use where the target material may be in a low concentration in a sample, is that the bead may not be completely coated, but rather only have a partial coating or have more than a single coating. Consequently, characterizations mentioned above have not been possible heretofore, have not been commercially feasible or problems remain without apparent solution.

SUMMARY OF THE INVENTION

One embodiment relates to a method of characterizing a parameter of a viral protein by holographic microscopy. The method includes steps of: receiving holographic image data having an a set of concentric bright and dark rings associated with a functionalized probe bead; determining by Lorenz-Mie analysis an effective sphere estimate of each of the functionalized probe bead's effective sphere diameter, and effective sphere refractive index; and determining a diameter difference between the effective sphere diameter with a predetermined diameter for unbound functionalized probe beads, with diameter difference representing the result of material bound to the bead and medium within the effective sphere estimate, wherein the effective sphere diameter (dp) is equal to $d_p = d_0 + 2\delta f$ wherein $d_p$ is the effective sphere diameter, $d_0$ is the predetermined diameter for unbound functionalized probe beads, $\delta$ is effective optical thickness of a complete layer of the viral protein, and f is the fraction of binding sites on the functionalized probe bead.

In another embodiment, a system is provided for characterizing a parameter of a sample by holographic microscopy. The system includes a holographic microscope including a laser beam source and an objective lens, the laser beam positioned to interact with a fluidic sample channel having media, probe beads, and target objects, scattering from the sample comprising probe beads having target objects bound to a surface and interacting with an unscattered portion of the laser beam to provide a holographic scattering pattern. The system further includes an image collection device for collecting image data characteristic of the scattering pattern from the holographic microscope. The system further includes a computer system including a processor and memory, the memory having stored thereon computer readable instructions, the computer readable instructions configured to: receive holographic image data of the sample; determine a first estimate of the number of coated probe beads in the holographic image data, each object associated with a set of concentric bright and dark rings; determine, for each set of concentric bright and dark rings a centroid defined by an approximate x, y position in a plane, with each pixel of the image data voting for pixels in a transformed image that may be centroids; determine an estimate of the axial position (z) of each of the coated probe beads; determine by Lorenz-Mie analysis an estimate of each of the coated probe beads effective sphere radius and effective sphere refractive index, where each coated probe bead is treated as an effective sphere for Lorenz-Mie analysis; determine by Maxwell Garneet effective-medium theory the effective coating diameter, and effective coating refractive index, an effective coating comprising bound target objects and media within an associated effective sphere; compare one of the radius and refractive index for each of the objects the same of radius or refractive index of a control sample; and determine for each one of the objects if that one object is bound to a material relative to the control sample.

BRIEF DESCRIPTION OF THE DRAWINGS

FIG. 1A shows an example of an in-line holographic video microscope. FIG. 1B is a magnified portion of FIG. 1A around the sample. An interference pattern is shown in FIG. 1C(1), and FIG. 1C(2) shows a fit of FIG. 1C(1) to predictions of Lorenz-Mie theory to obtain various measurements.

FIG. 6A(1) is a distribution of streaming particles as a function of index of refraction and observed sizes for a commercial polystyrene spherical particle continuing sample in water. FIG. 6A(2) is a 2D cross section from FIG. 6A(1) for the particle size and FIG. 6A(3) for index of refraction, both being at the mean value of the other parameter. FIGS. 6B(1) and 6B(2) show trajectory averaged radius and refractive index as a function of mean speed.

FIG. 9A shows bead-based assays use micrometer-scale colloidal spheres coated with binding sites to capture target particles from the surrounding fluid medium. FIG. 9B shows conventional assays detect the presence of bound targets by tagging them with fluorescent labels and then measuring the fluorescence. FIG. 9C shows HPC does not require labeling. It uses holographic video microscopy to record holograms of individual beads, such as the example in FIG. 9D. Fitting to predictions of the Lorenz-Mie theory of light scattering yield measurements of the particle's diameter, $\Delta d_p$ and refractive index, $\Delta n_p$. FIG. 9E shows repeated measurements on a stream of particles that build population statistics. Each point represents the properties of one sphere, and is colored by the local density of observations, $\rho(d_p, n_p)$.

FIG. 10A shows detection of the protein avidin binding to the surface of commercial biotinylated spheres. FIG. 10B shows detection of human immunoglobulin G (IgG) binding to the pathogenic surface marker, protein A.

FIGS. 12A and 12B show typical holographic molecular binding assay for a sample of probe beads incubated with 10 µg mL$^{-1}$ IgG. FIG. 12A shows holographically measured velocity profile. Each point represents the speed, $v_p$, of a single bead as a function of its axial position, $z_p$, relative to the instrument's focal plane. The solid curve is a fit to the parabolic Poiseuille flow profile. Horizontal dashed lines indicate the axial positions of the channel's walls inferred from this fit. Points are colored by each particle's measured diameter, $d_p$. Evenly mixed colors demonstrate that the results are not biased by the particles' positions in the channel. FIG. 12B shows holographic characterization data for the same sample of beads showing the distribution of single-particle diameter, $d_p$, and refractive index, $n_p$. Points are colored by the density of measurements, $\rho(d_p, n_p)$.

FIGS. 13A-13B show holographic molecular binding assays for IgG (FIG. 13A) and IgM (FIG. 13B) to colloidal beads coated with protein A dispersed in antibody binding buffer. IgM assay is performed with 150 mM added NaCl to suppress aggregation. Discrete points show the increase, $\Delta_d(c,\tau) = d_p(c,\tau) - d_0$, of the population-average effective-sphere diameter, $d_p(c,\tau)$, relative to the probe beads' reference diameter, $d_0$, as a function of antibody concentration, c after fixed incubation time $\tau$=45 min. Each data point represents an average of 1000 beads and is replicated three times. Solid curves are best-fits to eqn (5) for measurement time $\Delta_\tau$=2 min. FIG. 13C shows 45 minute incubation with alcohol dehydrogenase (ADH) has no measurable effect on probe bead diameters.

FIG. 14A shows geometry of a bead-based molecular binding assay. A substrate bead with diameter $d_0$ and refractive index $n_0$ is coated with a layer of functional groups that bind target molecules from the surrounding solution. The surface groups are modeled as a dielectric layer of thickness $a_1$ and refractive index $n_1$. The coating of bound target molecules is modeled as a second layer of thickness $a_2$ and refractive index $n_2$. The bead is dispersed in a medium of refractive index nm. The bounding sphere has diameter $d_p = d_0 + 2(a_1 + a_2)$. FIG. 14B shows synthetic hologram of a coated bead computed with the DDA. Parameters are chosen to mimic a typical molecular binding assay based on a probe bead with a polystyrene core: $d_0$=1 µm, $n_0$=1.60, and molecular overlayers with $a_1 = a_2$=10 nm, $n_1 = n_2$=1.55. FIG. 14C shows the effective-sphere model treats the coated sphere as if it were a homogeneous dielectric sphere of effective diameter $d_p^*$ and refractive index $n_p^*$. FIG. 14D shows fitting the coated-sphere's hologram from FIG. 14B with the Lorenz-Mie theory for a homogeneous sphere yields an indistinguishable hologram for $d_p^*=1.03$ μm and $n_p^*=1.594$.

FIGS. 15A-15B show holographic images of homogeneous spheres computed with DDA are then fitted to Lorenz-Mie theory. Their deviations from the inputted values are $(d_{p,p})=d_p^*-d_p$ (FIG. 15A), and $\epsilon_n(d_p,n_p)=n_p^*-n_p$ (FIG. 15B). Errors can be positive or negative for both parameters, but in this region of parameter space, errors in $n_p$ are predominantly negative. Discrete points indicate the properties of polystyrene substrate beads used in published molecular binding assays with diameters $d_p=1$ μm and $d_p=1.8$ μm. The smaller of these lies in a region of parameter space where agreement between DDA and Lorenz-Mie formulations is particularly good with $\epsilon_d < 5$ nm.

FIG. 17A shows a shift in effective diameter $\Delta(n_1)=d_p^*-d_0$ is linear with coating index $n_1$, with $n_1=n_0=1.6$ corresponding to a shift of 10 nm. A regression line (dotted) is fitted to the data. FIG. 17B shows a shift in effective refractive index, $\Delta(n_1)=n_p^*-n_0$, is positive for $n_1>n_0$ and negative for $n_1<n_0$. The horizontal dashed line indicates the baseline, $\Delta_n=0$.

In FIG. 19A, $\Delta d_p^*$ is shown to be largely independent of the index of the first coating, $n_1$. In FIG. 19B, $\Delta n_p^*$ can be either positive or negative depending on coating parameters, but is close to zero when $n_1=n_{0,2}=n_0$ (dashed lines), where $n_0=1.6$. A larger shift was observed in effective index when the coating indexes are above that of the underlying sphere.

DESCRIPTION OF PREFERRED EMBODIMENTS

Figure 2:
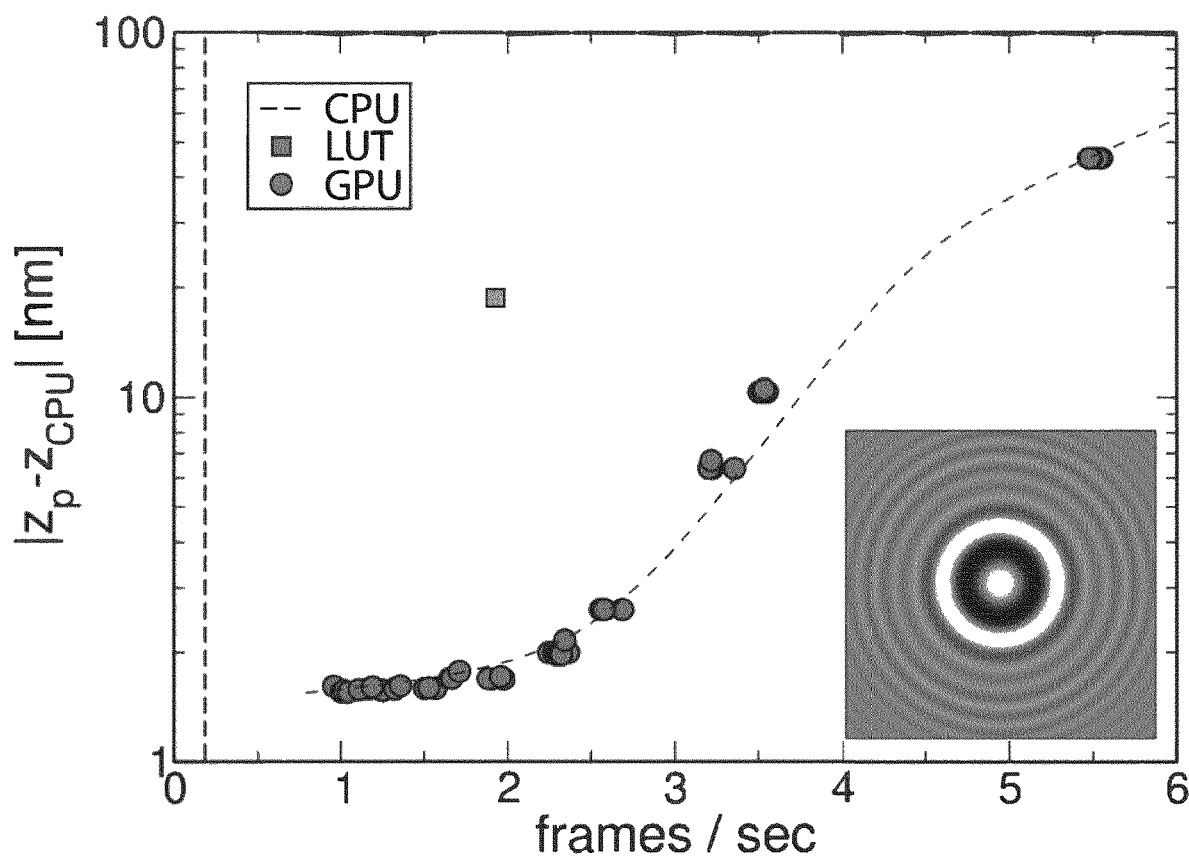
FIG. 2 shows processing speed and relative error in $z_p$ for fits, performed in accordance with the invention, to measured holographic images of a 2.2 μm diameter silica sphere using a one-dimensional look-up-table (squares) and single-precision GPU-accelerated fits (circles). The inset image shows a typical 201×201 pixel hologram and errors are computed relative to the double precision result obtained on a single-thread of the CPU (central processing unit), whose processing rate is indicated by the dashed line and the smooth curve is a guide to the eye.

A holographic microscope 100 constructed for implementation of the invention is depicted schematically in FIG. 1A. Sample 110 is illuminated with the collimated and linearly polarized beam 120 from a HeNe laser operating at a vacuum wavelength of λ=632.8 nm (Uniphase 5 mW). Other laser wavelengths, such as λ=537, can also be employed (Coherent Verdi at 5W). Light 130 scattered by the sample 110 interferes with the unscattered portion of the illuminating beam 120 to form an in-line hologram in the focal or imaging plane 125 of the microscope 100. The resulting heterodyne scattering pattern (see FIG. 1C(1)) is magnified by the microscope's objective lens 145 (Nikon Plan Apochromat Lambda 100× oil immersion, numerical aperture 1.4), and projected with a 1× video eyepiece onto a video camera 135 (or plural camera for some embodiments) (FLiR Flea3 USB3), which records 1 ms exposures every 20 ms with a system magnification of 0.048 μm/pixel. As described hereinafter this scattering, or interference pattern, is fit to predictions of the Lorenz-Mie theory (see FIG. 1C(2)).

This video signal can be recorded as an uncompressed digital video stream at 50 frames/s using a standard USB computer interface to yield an eight-bit image, a(r). Normalizing each image by a previously recorded background image, B(r), eliminates spurious interference fringes due to reflections and imperfections in the optical train and provides the real-valued array a(r)=a(r)/B(r) for analysis. In one implementation, each pixel in the 1280×1024 array contains roughly five bits of information.

The data in a(r) is interpreted using results for generalized Lorenz-Mie scattering theory. The electric field in the microscope's focal plane is the superposition of the incident plane wave, $E_0(r)=u_0(x,y)\exp(ikz)\hat{x}$, and the scattering pattern $E_s(r)=u_0(r_p)f_s(k(r-r_p))$ due to a sphere centered at $r_p$. There, $k=2\pi n_m/\lambda$ is the light's wavenumber in a medium of refractive index $n_m$. After normalization, $$a(r) \approx 1 + 2R\{\exp\exp(-ikz_p)f_s(k(r-r_p))\cdot\hat{x}\} + |f_s k(r-r_p)|^2 \quad (1)$$

The scattering function may be expanded in a series of vector spherical harmonics:

$$f_s(kr) = \sum_{n=1}^{n_c} f_n\left(ia_n N_{e1n}^{(3)}(kr) - b_n M_{o1n}^{(3)}(kr)\right) \quad (2)$$

where $f_n=i^n(2n+1)/[n(n+1)]$. The generalized Lorenz-Mie expansion coefficients, $a_n$ and $b_n$, depend on the size, shape, composition and orientation of the scattering particle in the illuminating field. For a homogeneous isotropic sphere of radius a illuminated by a plane wave of wave number k, these coefficients fall off rapid with order n, and the series is found to converge after a number of terms $n_c=(ka)+4.05(ka)^{1/3}+2$. For a micrometer-scale latex sphere in water, $n_c \leq 30$. The normalized image of an individual sphere can be fit to Eq. (1) for the sphere's position $r_p$, its radius a, and its refractive index $n_m$.

Although the scattering coefficients must be computed with great care, the numerical challenge presented by Eq. (2) is in evaluating the vector spherical harmonics $M_{o1n}^{(3)}(k(r-r_p))$ and $N_{e1n}^{(3)}(k(r-r_p))$ at each pixel in a(r) for each trial value of $r_p$. Each sphere's image can subtend tens of thousands of pixels, and the functions typically must be evaluated hundreds of times in the course of each nonlinear fit. Even with the best conventional computationally efficient formulations of the relevant special functions, a fully converged fit can take several seconds on a single processor.

One most preferred form of the invention concerns methods to accelerate these fits using the Lorenz-Mie technique combined with particular programming steps. As will be shown hereinafter this methodology reveals solutions to problems and enables commercially effective characterizations, wherein those solutions were not even previously available. One of the reference systems consists of micrometer-scale latex spheres freely diffusing in water at room temperature, whose normalized hologram is shown in FIG. 1C(1). Images such as this may be analyzed by software, such as software developed in the IDL programming language (Harris Geospatial Solutions, Inc.), taking advantage of the MPFIT suite of Levenberg-Marquardt nonlinear least-squares fitting routines. Alternatively, such images can be analyzed with software developed in the Python programming language. These fits typically yield the particle's in-plane position to within 3 nm, its axial position to within 10 nm, its radius to within 1 nm and its refractive index to within 1 part in $10^4$. Error estimates obtained from uncertainties in the fit parameters are independently confirmed by dynamical measurements.

Much of the computational burden of fitting Eq. (1) to a normalized holographic image can be relieved by evaluating $f_s(kR)$ along the line segment $R=|r-r_p|$ and then interpolating to obtain $f_s(k(r-r_p))$. This approach exploits the approximate radial symmetry of a(r) about the particle's center. The data in FIG. 2 demonstrate the substantial reduction in processing time attained in this way. Although expedient, one-dimensional look-up tables do not account for slight polarization-dependent asymmetries in spheres' image, and can fail to capture rapidly varying features in a(r). Consequently, results for the particle's position and characteristics obtained from interpolated fits differ slightly from reference value obtained with two-dimensional fits. Under circumstances where precision can be sacrificed for speed, the convergence tolerances on both one- and two-dimensional fits can be relaxed to obtain results with fewer optimization cycles. For instance, accepting tracking errors of 5 nm in plane and 20 nm in the axial direction yields a tracking rate for a 201×201 pixel image of 20 frames/s on an Intel Core i7 processor, as shown in FIG. 2.

More substantial gains can be obtained by combining the Lorenz-Mie formalism with exploiting the parallel processing capabilities of a graphical processing unit (GPU) typically used in high-end computer graphics cards. Further detail concerning the GPU will be illustrated hereinafter in reference to FIG. 8 and the computer 200. Whereas conventional CPU-based implementations operate on each pixel in sequence, a GPU-enabled algorithm operates on all pixels simultaneously. The analysis utilized a GPU-enabled computation of $f_s(kR)$ using the GPUlib (Tech-X Corp., Boulder, CO) extensions to IDL on an nVidia 280 GTX graphics card (nVidia Corp., Santa Clara, CA) installed in the host computer. GPUlib provides access to the underlying CUDA framework for mathematical computation on GPUs without requiring the sophisticated programming techniques typically required to implement mathematical computations on GPUs. In one embodiment, a GPU-enabled computation of $f_s(kR)$ using the cupy package for Python is utilized, which similarly leverages hardware accelerated numerical computations using the CUDA framework. With these enhancements, two-dimensional fits run with full precision at nearly 50 frames/s, a factor of 20 faster than CPU-based analysis. Accepting 5 nm in-plane resolution and 50 nm axial resolution yields particle tracking and characterization data at more than 100 frames/s, as shown in FIG. 2. The GPU, furthermore, supports multi-threaded operation. When supported by a multi-core CPU, this means that several analyses can proceed in parallel, yielding a proportional increase in total processing speed. This may be considered to be real-time performance in some applications. The meaning of "real time" is that image data from each frame snapshot of image data is available for processing and use before the next frame snapshot arrives. As will be noted hereinafter this allows real time characterization of a particle of a sample, such as for example, of a sample's position, radius and index of refraction, and molecular level coatings like bead based molecular binding features. At least two of these parameters can be determined at a time and can even be all simultaneously. Substantial further acceleration could be attained by implementing the same fitting algorithm in an optimized compiled programming language.

Figure 3A:
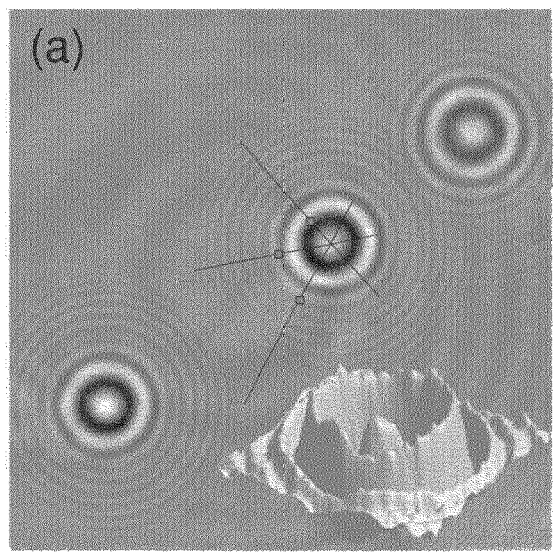
FIGS. 3A and 3B are, respectively, an original and transformed holographic images of three colloidal spheres; superimposed line segments in FIG. 3A indicate the "votes" cast by three representative pixels, and intensity in FIG. 3B is scaled by the number of votes, with black representing 0 and white representing 800 votes and superimposed surface plots illustrate the middle sphere's transformation (scale bar indicates 10 µm).
Figure 3B:
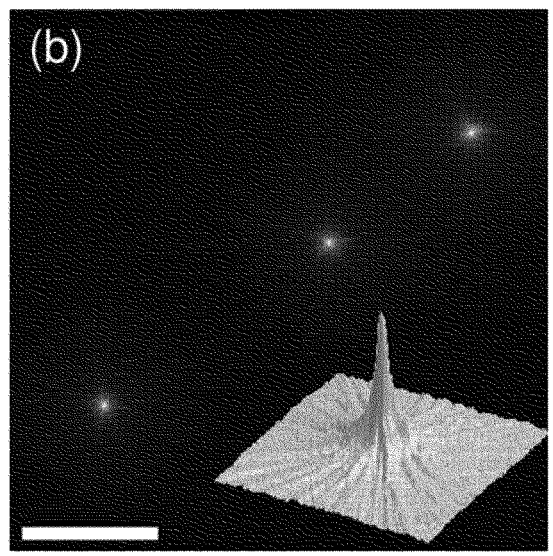

Even if fitting to a particle's image proceeds rapidly enough for real-time applications, analyzing a snapshot requires a preliminary identification of the particles of the sample 110 in the field of view, and starting estimates for the particle's position, size and refractive index that are sufficiently accurate for the fit to converge to the globally optimal solution. This initialization process must be both fast and reliable if holographic analysis is to be useful for unattended automated processing. Each sphere appears in a snapshot, such as the example in FIG. 3A, as concentric bright and dark rings. The gradient of the intensity at each pixel therefore defines a line segment in the imaging plane along which a sphere's center may lie. The intersection of such lines defines an estimate for the particle's centroid in the focal plane. In the most preferred embodiment the particle is a sphere. As described below, the particle, such as a probe bead, with bound material may not be spherical but may be treated as a sphere. The centroid may be identified by a number of techniques, such as a voting algorithm to find the centroid, using a pattern-matching method to find the centroid and using a machine-learning algorithm to find the centroid. In one such embodiment, Such intersections were identified with a simplified variant of the circular Hough transform in which each pixel in the original image casts "votes" for the pixels in the transformed image that might be centroids. FIG. 3A indicates the votes cast by three representative pixels in the original image. The single-pixel votes are accumulated in a transformed image, such as the example in FIG. 3B. In this case, the transformed image has the same resolution as the original, a choice that yields both reasonable accuracy and speed. Those pixels in the transformed image with the most votes are taken to be centroid candidates, and their locations used as the in-plane coordinates to initialize fits. The inset surface plots demonstrate how the extended interference pattern due to a single sphere is transformed into a sharply defined peak, even if two or more spheres' holographic images overlap. This methodology is more computationally efficient than the conventional circular Hough transform, which uses additional resources to record information about each potential circular region's radius. Refining the centroid estimate by computing the brightness-weighted center of brightness for each feature in the transformed image typically identifies particles' centroids to within a few tenths of a pixel, or a few tens of nanometers.

Having estimated a particle, or sphere's, in-plane coordinates, its axial coordinate is estimated by back-propagating the measured light field using the Rayleigh-Sommerfeld propagator. Peaks in the reconstructed axial intensity correspond with particle positions to within 100 nm, even when particles occlude each other along the optical axis. This back-propagation can be performed with a one-dimensional slice of image data, centered on the particle's position, and therefore can be performed very rapidly.

Figure 4:
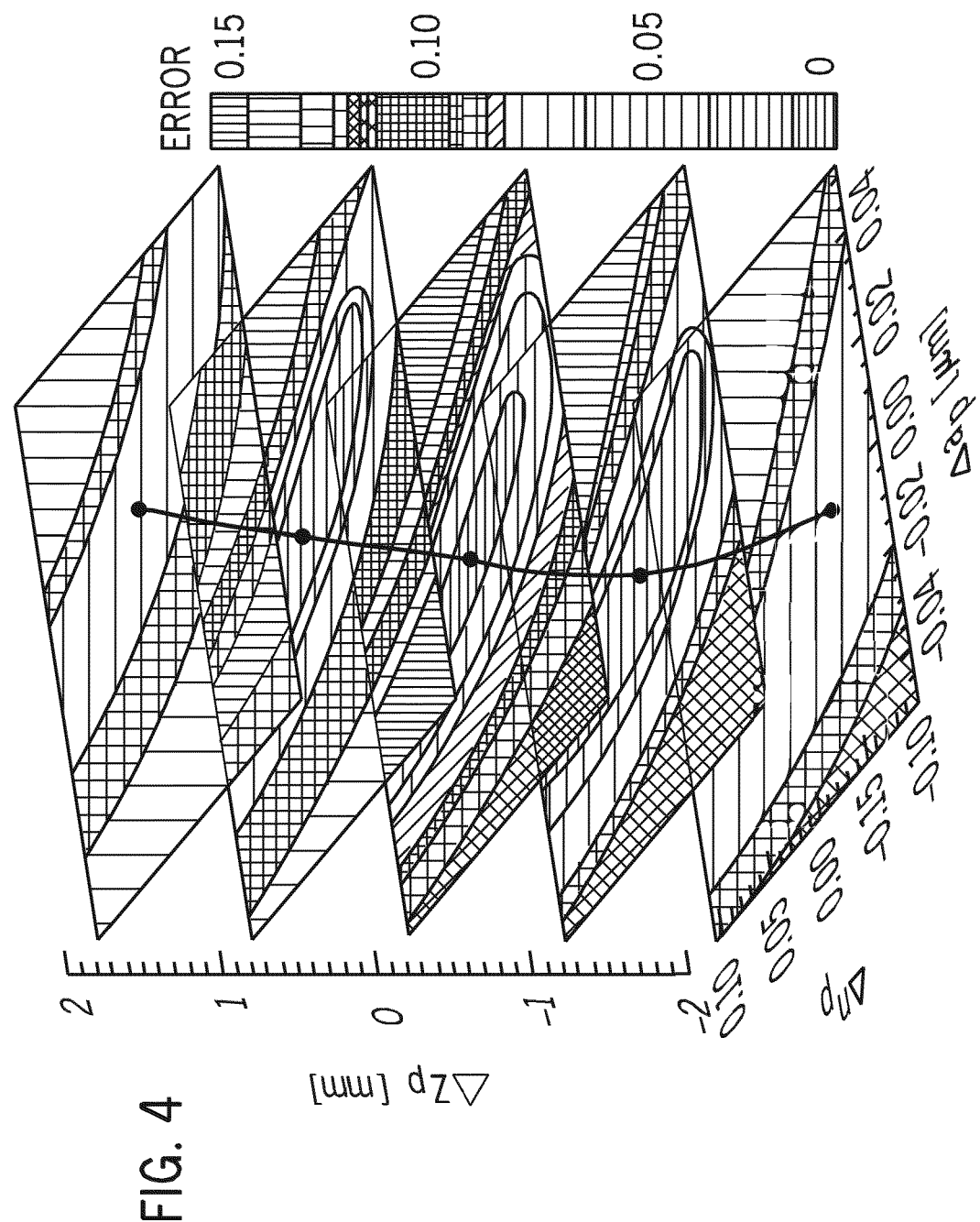
FIG. 4 shows the root-mean-square error in the hologram estimated for a 1.5 µm diameter silica sphere in water as a function of the error in radius, $\Delta a_p$, refractive index, $\Delta n_p$, and axial position, $\Delta z_p$, where the curve indicates the path of minimum error parameterized by $\Delta z_p$.

Accurately estimating the size and refractive index of an unknown particle is substantially more difficult. Fortunately, the error surface for the nonlinear fits slopes smoothly and monotonically toward the globally optimal values over a very large catchment basin in the parameter space defined by $a_p$, $n_p$, and $z_p$. FIG. 4 shows the root-mean-square error in the local image intensity computed for a 1.5 mm diameter silica sphere in water at $z_p$=20 mm, as a function of $\Delta a_p$, $\Delta n_p$, and $\Delta z_p$ errors in the radius, refractive index and axial position of the particle, respectively. These data demonstrate that fits to such a particle's image should converge to the optimal values even if the initial estimates are in error by more than 0.1 in the refractive index, 0.5 mm in the radius and 2 mm in the axial position. The error surface becomes more highly structured, and thus less forgiving, if the estimated in-plane centroid is in error by more than a hundred nanometers or so. Fortunately, the voting algorithm routinely yields sufficiently accurate results to ensure robust convergence. Tracking a particle through a sequence of images can be further accelerated by using the results from one fit as the initial estimates for the next. In this case, no additional pre-fitting is required.

The combination of rapid centroid identification and accelerated image fitting yields accurate and highly precise measurements of colloidal spheres' positions and characteristics in near or in real time as described hereinbefore. Unattended holographic particle tracking and characterization should find numerous applications in process control and quality assurance as well as in high-throughput and combinatorial assays. Substantial further acceleration should be possible through more aggressive software optimization and parallelization, without recourse to exotic hardware solutions.

Figure 5A:
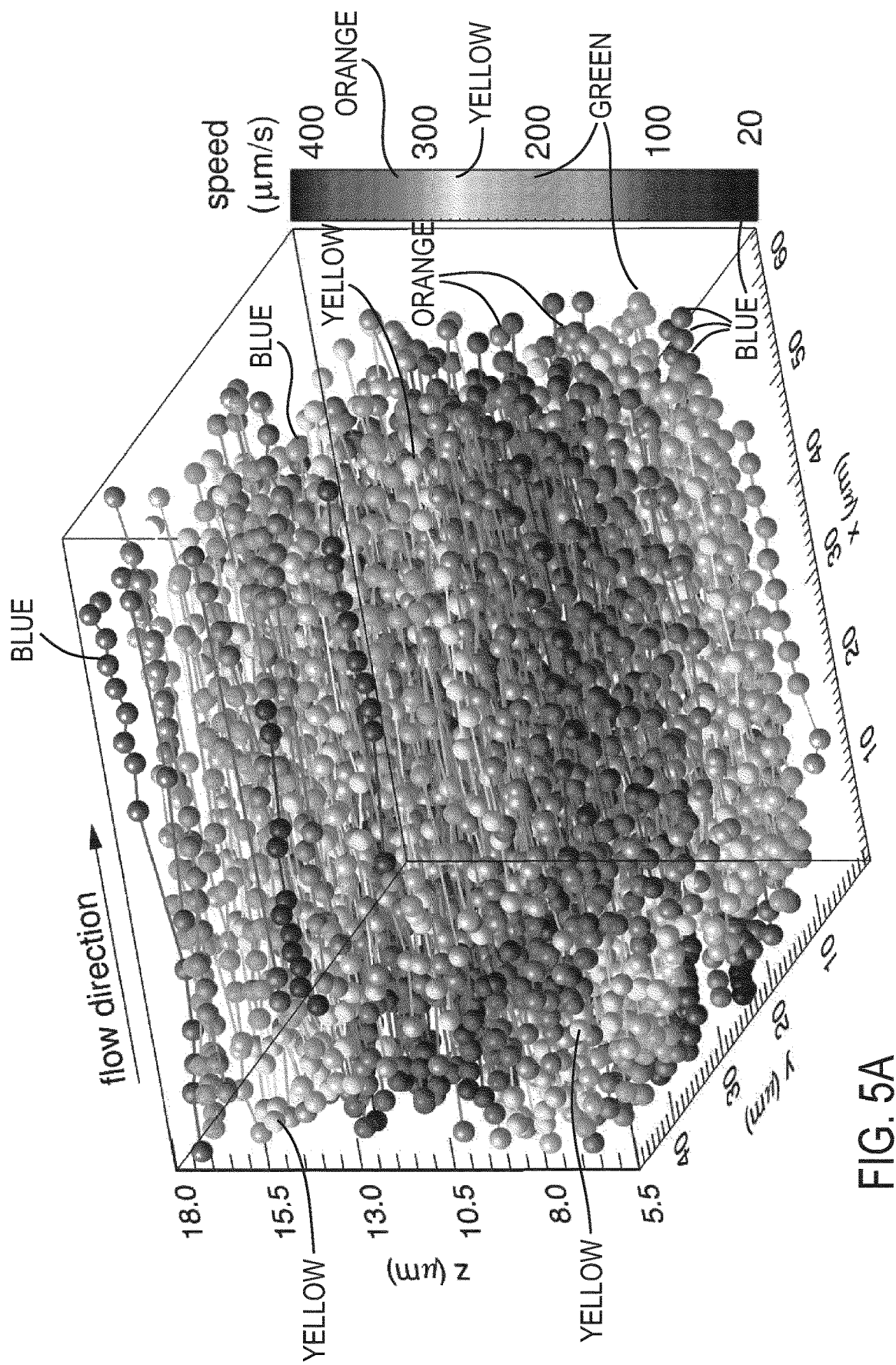
FIG. 5A shows holographic particle image velocimetry measured through dimensional trajectories of 500 colloidal spheres traveling down a microfluidic channel in a pressure driven flow with each sphere representing the particle position in one field of a holographic snapshot and features from field sequences are linked into trajectories with gray scale showing a range of particle measured speeds.

Holographic particle tracking has immediate applications for three-dimensional particle image velocimetry. FIG. 5A shows an example in the form of the superimposed trajectories of 500 individual one micrometer-diameter polystyrene spheres (Duke Scientific, catalog number 5100A) travelling down a 2 cm long microfluidic channel of 100 μm width and 17 μm depth. The spheres were dispersed in water at a volume fraction of $10^{-5}$, and were advected by a pressure-driven flow of water created by raising a reservoir against gravity. Images were obtained in a 50×70 μm² area near the middle of the channel, with the focal plane set roughly 5 μm below the lower glass/water interface. Spheres' locations in each snapshot are linked with a maximum-likelihood formalism approach into single-particle trajectories, $r_p(r)$, sampled at 1/60 s intervals. Not every time step is represented in each particle's trace because faster-moving particles near the midplane of the flow occasionally obscure slower-moving particles near the walls. FIG. 5A presents only those particle positions that were identified unambiguously. Even such incomplete time series can be used to estimate the particles' instantaneous velocities. The traces in FIG. 5A are of a gray scale according to the trajectory-averaged speed.

Figure 5B:
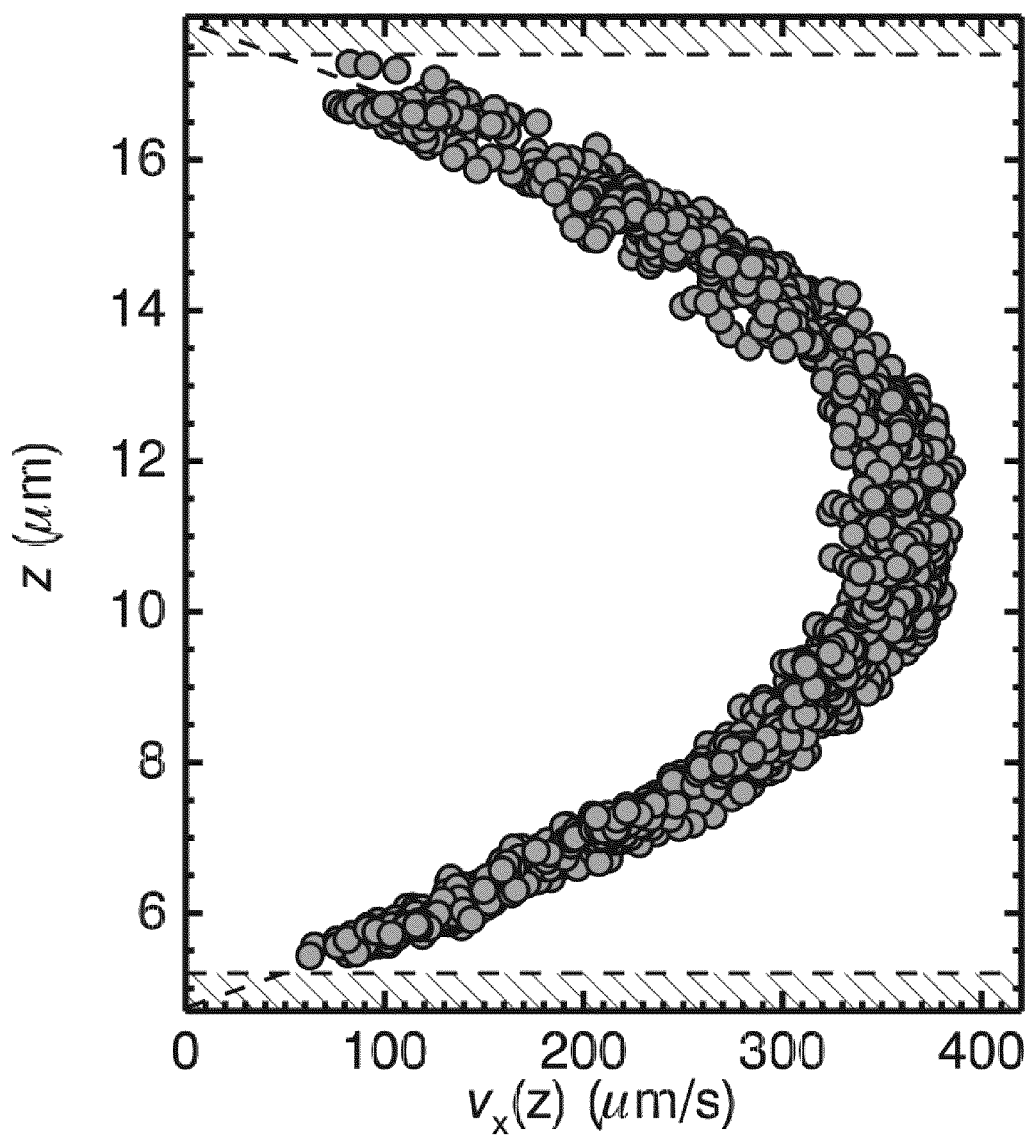
FIG. 5B shows a Poiseuille flow profile along the vertical direction obtained from FIG. 5A data with particles excluded from the shaded region by interactions with upper and lower glass walls of the channel (the dashed curve is a fit to the anticipated parabolic flow profile).

These trajectories also are useful for mapping the three-dimensional flow field. Each point in FIG. 5B represents one particle's speed as a function of its mean height, z, in the microfluidic channel. The superimposed results of 1000 such trajectories clearly show the parabolic flow profile expected for Poiseuille flow down a channel, the width of the cluster of data reflecting spatial variations across the long horizontal axis of the channel. The limits of the vertical axis indicate the positions of the channel's upper and lower walls, with heights being reported relative to the microscope's focal plane. The dashed horizontal lines represent the region of the flow into which particles cannot wander because of their hard-sphere interaction with the glass walls. The fit parabola shows the flow vanishing at the channel's boundaries.

Each trajectory also yields trajectory-averaged measurements of the radius and refractive index for each particle individually. Combining multiple measurements on a single particle minimizes systematic errors due to inevitable position-dependent variations in the illumination. The results in FIGS. 6A(1)-6A(3) show the radii and refractive indexes of the spheres in a commercial sample of polystyrene microspheres dispersed in water. FIGS. 6A(2) and 6A(3) show the 2D histograms taken from FIG. 6A(1). The mean radius of $a_p$=0.4995 μm agrees with the manufacturer's specification obtained by conventional light scattering, as does the measured 2.5 percent polydispersity in the radius. The mean refractive index of $n_p$=1.595 is consistent with independent measurements on polystyrene spheres.

Single-particle characterization is a substantial benefit of holographic characterization compared with bulk light-scattering measurements, which are the usual basis for analyzing particle dispersions. Building up distributions such as the example in FIGS. 6A(1)-6A(3) from single-particle measurements eliminates the need for population models, and thus affords more general insights into a sample's composition. For example, the anticorrelation between the particles' size and refractive index evident in FIGS. 6A(1)-6A(3) would not be apparent in light scattering data. No such anticorrelation is apparent in holographic analyses of homogeneous fluid droplets. One interpretation of this observation is that the larger spheres in the emulsion polymerized sample are more porous, and consequently have lower refractive indexes.

Simultaneously tracking and characterizing individual particles(and in real time as described hereinbefore) enables us to confirm the results' freedom from motion-based artifacts. Colloidal particles' images become blurred if they move during the period that the camera's shutter is open. This blurring introduces substantial artifacts into conventional bright-field video microscopy data. As the results in FIGS. 6B(1)-6B(2) demonstrate, however, motion blurring has no discernible influence on values for the radii and refractive indexes as a function of mean speed obtained by holographic analysis for speeds as high as 500 μm/s. Additional measurements reveal deviations from the population average values only for peak flow speeds exceeding 700 μm/s.

This robustness is surprising because particles travelling at several hundred micrometers per second traverse several of the camera's pixels during its 1 ms shutter period. The resulting incoherent average of the oscillatory scattering pattern serves primarily to reduce the contrast in the direction of motion, however, and so has little influence on the Lorenz-Mie fit. Even this amount of blurring could be reduced through the use of a faster shutter or a pulsed laser for illumination.

Being able to characterize individual colloidal particles in real time as they travel down a microfluidic channel provides an effective basis for detecting molecular-scale coatings on functionalized beads. If the individual spheres' radii were known to within a nanometer or so, then the presence of a molecular coating of similar refractive index could be discerned in the apparent increase in the radius. More generally, the characteristics of a treated sample can be compared with control measurements on untreated spheres.

Figure 7A:
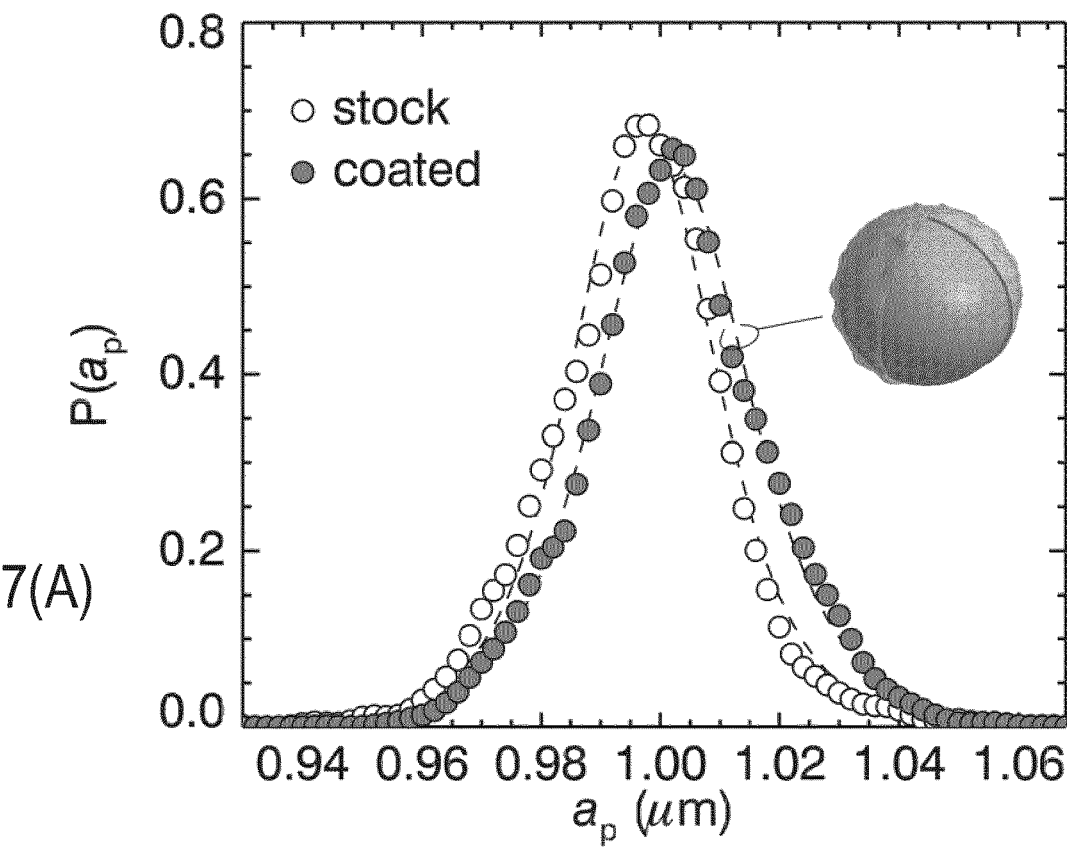
FIG. 7A shows detection of avidin binding to biotinylated polystyrene spheres with light circles the probability distribution for measured particle radius in stock spheres with dark circles having a corresponding distribution for a sample of the sphere after incubation with neutravidin (dashed curves are guides for the eye).
Figure 7B:
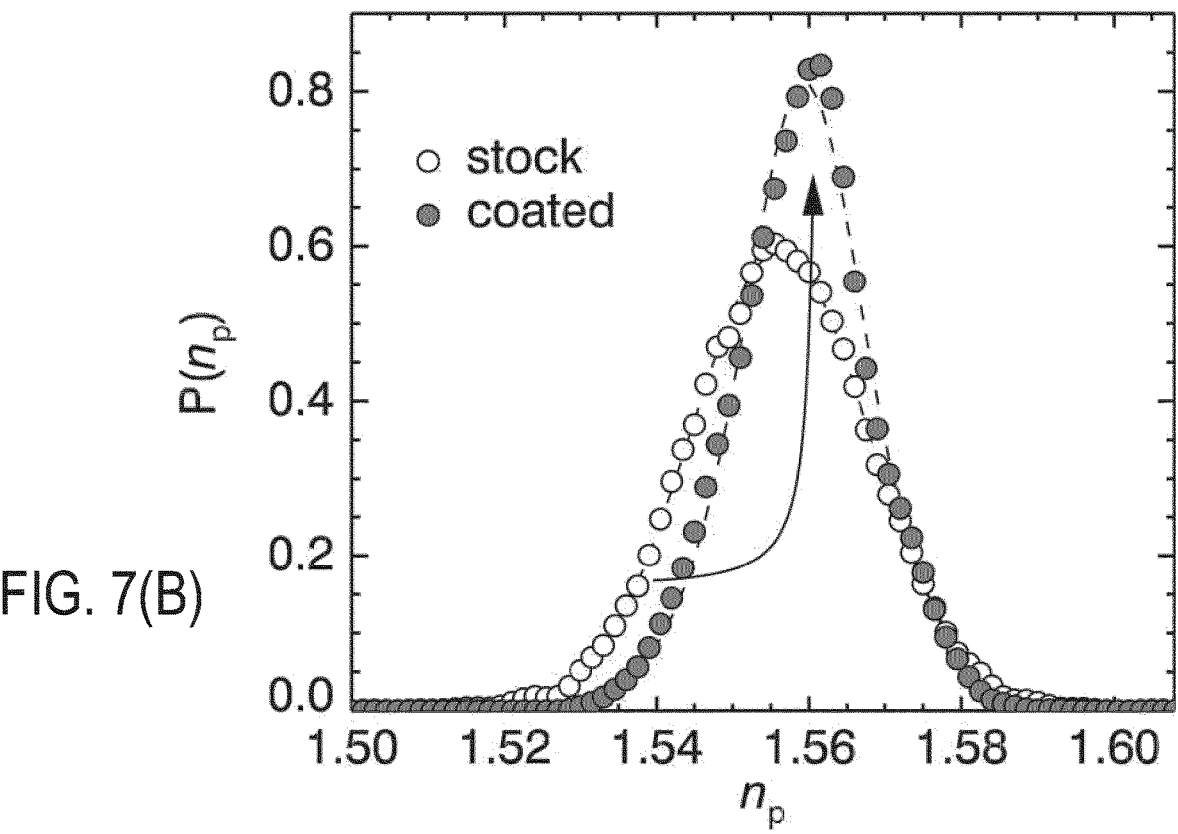
FIG. 7B is the equivalent distribution for particles' refractive indices with the arrow indicating redistribution of probabilities from a low density tail in a stock sample to the peak in the coated sample.

FIGS. 7(A)-7(B) show one such comparative example study of 2 μm diameter biotinylated polystyrene spheres before and after incubation with neutravidin. The biotinylated polystyrene spheres used in this study were obtained from Polysciences Inc (Warrington, PA) (catalog number 24172). Neutravidin was obtained from Invitrogen (Carlsbad, CA) (catalog number A2666). A neutravidin solution at a concentration of 1 mg/mL was prepared by adding 1 mg of neutravidin to 1 mL of phosphate buffer saline (PBS) (50 mM, [NaCl]=50 mM). The stock sample of beads was obtained by adding 10 μL of the as-delivered dispersion to 990 μL of PBS. The coated sample was prepared by adding 10 μL of the as-delivered dispersion to 990 μL of neutravidin solution. Particles were incubated and shaken at room temperature for 1 hr before they were introduced into the microfluidic channels by capillary action. Flow was induced by introducing a slip of absorbent paper into one end of the channel and images recorded until results were obtained for 1,000 spheres from each sample. Each data set consisted of roughly 5,000 holographic measurements, which were obtained over the course of roughly 5 min.

From these measurements, that the untreated sample was determined to have a population averaged radius of 0:996±0: 015 μm (see FIG. 7A), consistent with the manufacturer's specification. The incubated population appears to some 6 nm larger, with an average radius of 1:002±0:015 μm. Even though the two size distributions plotted in FIG. 7A overlap substantially, a Wilcoxon rank-sum test demonstrates that their means differ with better than 99 percent certainty. This then constitutes a statistically significant detection of change in the treated sample's radius, which can reasonably be ascribed to the presence of a molecular-scale coating. The coating's thickness, in this case, is consistent with the size of a multi-domain avidin derivative.

Pronounced differences between the two samples also are evident in the measured distribution of refractive indexes, plotted in FIG. 7B. The incubated sample's distribution is significantly sharper, presumably because protein, whose refractive index is similar to that of polystyrene, displaces water in the spheres' porous surfaces, and raises their effective refractive indexes. This would affect the more porous particles on the lower side of the refractive index distribution more than the denser particles on the high side, thereby sharpening the distribution. The arrow in FIG. 7B indicates this redistribution.

Similar analyses of random samples of the two data sets further confirm that the particles from the untreated sample all come from the same population, whose size and refractive index is consistent with the manufacturer's specification. The treated samples, by contrast show more variability in size, possibly because the thickness and evenness of the bound avidin layer can vary from sphere to sphere.

These results demonstrate the utility of hardware-accelerated digital video microscopy for detecting in real time molecular-scale coatings on functionalized colloidal spheres. Unlike conventional molecular binding assays, holographic analysis does not require fluorescent or radiological markers, and so eliminates the effort and expense ordinarily required to label molecules bound to beads.

Figure 8:
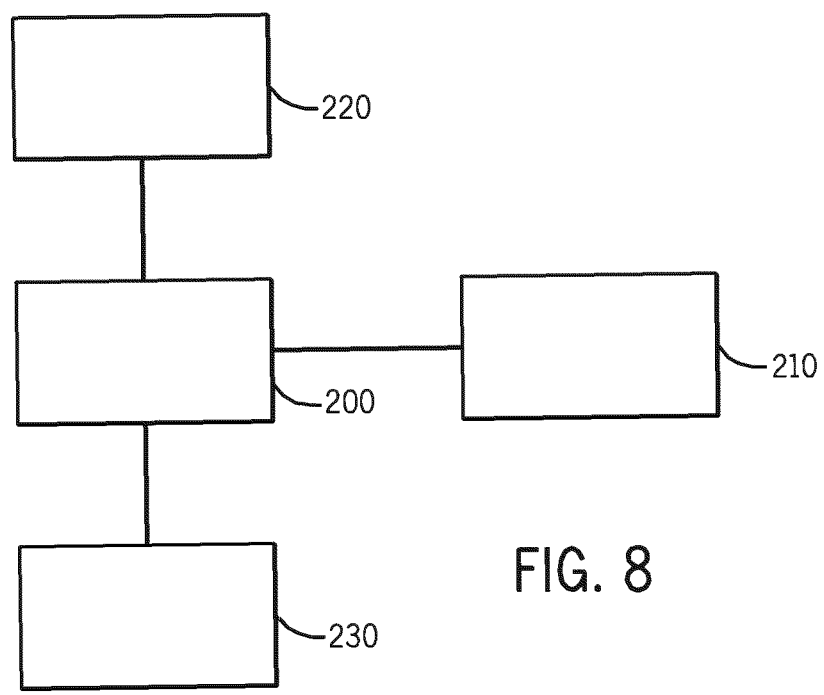
FIG. 8 shows a schematic block diagram of a computer system for implementing the methods of the invention.

In one embodiment of the invention the method of the invention can be implemented to determine parameters and features of interest by use of the computer system shown in FIG. 8. The system of FIG. 8 includes a computer 200 (which can include a CPU and/or GPU in a most preferred embodiment as described herein in connection with Lorenz-Mie analysis) which can execute a computer readable medium, such as a computer software module with instructions which are embedded, for example, in a computer addressable storage medium 210. The use of the GPU in the computer 200 thereby allows real time analysis and simultaneous evaluation of parameters such as molecular coatings and/or of a particle's position, radius and index of refraction. This storage medium 210 can be read/writeable which enables data to be written thereto. This feature allows subsequent static or dynamic data analysis; and results of that analysis allow a user to act on that information for advantageous applications. The computer 200 executes the computer software module instructions to analyze data produced by the previously described methods of the invention. Such data can be obtained from the storage medium 210 and input via device 220. Other conventional devices, such as an output device 230 (e.g., a display, printer and/or a storage medium) can enable viewing and further data analysis. Such analysis can yield information about the position and characteristics of particles in real time or delayed time.

Certain embodiments described hereinbefore use holographic video microscopy in a single wavelength to detect molecular-scale coatings on micrometer-diameter dielectric colloidal spheres. This detection was accomplished by analyzing a population of spheres that had been exposed to the coating molecules and comparing the results with those obtained by analyzing a comparable population of spheres that had not been exposed. Holographic snapshots of individual spheres in each population were analyzed with the Lorenz-Mie theory of light scattering to obtain estimates for the sphere's radius and complex refractive index. Lorenz-Mie analysis yields each sphere's radius with nanometer resolution and its refractive index to within a part in a thousand. The systematic differences in the population distributions of these properties constitute the basis for detecting the molecules. Coated spheres appear systematically larger by an amount consistent with the thickness of the coating.

In an alternative embodiment, the Lorenz-Mie analysis can employ two-color or multi-color holograms to provide comparable detection resolution using only a single sphere, rather than populations of spheres. Thus the input beam 120 in FIG. 1A provides an output of a multi-color hologram. This embodiment creates simultaneous holographic images in two or more wavelengths. These multi-color holograms can be recorded on separate video cameras 135 (see FIG. 1A) using filters to separate the images. Alternatively, they can be recorded with a color camera 135, and the separate images obtained from the recorded color channels.

The spheres used for these types of measurements should have comparable optical properties in the wavelengths used. The coating, however, should have strongly differing properties in at least two of the wavelengths. For instance, the coating might be a pure dielectric in one wavelength and strongly absorbing in another. In the absence of a coating, holograms obtained in multiple wavelengths should yield identical results for the particle's position and size. Coated spheres' holograms should differ significantly in the estimated size and in the qualitative features of the estimated refractive index obtained from each wavelength. Such differences would constitute a detection of the molecular-scale coating. Suitable choice of wavelength, sphere size and sphere composition should provide quantitative information on the thickness or completeness of the coating. In one embodiment, holographic assays for protein binding, including antibody binding, using probe beads that are functionalized with chemical groups that selectively bind molecules of interest. For example, the targeted materials may be proteins associated with a pathogen or associated with materials responsive to pathogens such as antibodies. The probes may be micrometer-scale colloidal probe beads. When used herein, "viral protein" includes a) a protein from a virus, (b) a protein that is expressed on the surface of an intact virus, or (c) an antibody to the virus. Viruses for which the described immune assays may be used include, but are not limited to SARS-CoV-1, SARS-CoV-2 and H1N1.

In a particular assay, probes are functionalized for binding or interacting in a targeted manner with COVID-19 virus. The surfaces of the probe beads are functionalized with antibodies that bind proteins in the coat of SARS-CoV-2, the coronavirus responsible for COVID-19. These antibodies will bind virions if they are present in the fluid medium, changing the beads' effective size by tens of nanometers relative to unbound functionalized probe beads. The increased diameter of the complex of virions bound to functional probe beads will have a larger radius as determined by holographic video microscopy analysis.

In a further embodiment, binding assays for viruses and antibodies can be combined in a multiplexed test using the ability of holographic video microscopy systems to differentiate particle types. Synthesis and functionalization of probe beads can be carried out using batch-mode synthesis. Unlike other proposed viral testing techniques, no microfabrication is required, which is an advantage relative and will facilitate rapid scale-up. Further, the holographic video microscopy measurement may be carried out in a disposable microfluidic channel. One specific embodiment requires only 30 µL of specimen fluid, allowing for testing using very small samples and reducing the volume of sampling material that must be managed. In one embodiment, the holographic video microscopy assay system can provide a report on the analysis of a sample within 30 minutes, providing roughly a 50 sample per day test throughput for the system. In a further embodiment, the system may utilize robotic sample handling.

As discussed, for a COVID-19 assay, the probes may instead, or also, be functionalized to bind with biologic materials associated with COVID-19 presence in a human body, such as antibodies triggered by the virus's presence.

As a non-limiting example, FIG. 9A shows bead-based assays use micrometer-scale colloidal spheres coated with binding sites to capture target particles from the surrounding fluid medium. FIG. 9B shows conventional assays detect the presence of bound targets by tagging them with fluorescent labels and then measuring the fluorescence. FIG. 9C shows HPC does not require labeling. It uses holographic video microscopy to record holograms of individual beads, such as the example in FIG. 9D. Fitting to predictions of the Lorenz-Mie theory of light scattering yield measurements of the particle's diameter, $d_p$ and refractive index, $n_p$. FIG. 9E shows repeated measurements on a stream of particles that builds population statistics. Each point represents the properties of one sphere, and is colored by the local density of observations, $\rho(d_p, n_p)$.

Figure 10A:
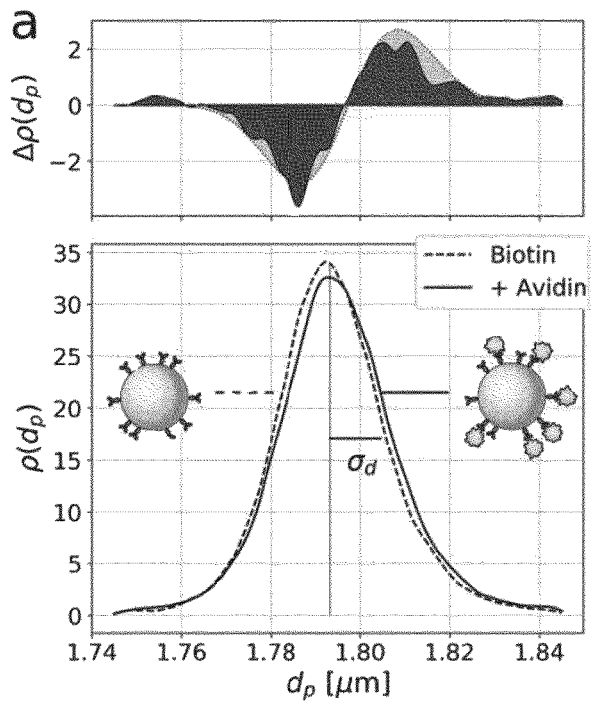
FIGS. 10A-10B show holographic binding assays applied to protein binding. HPC resolves the mean particle diameter with nanometer precision, and therefore clearly detects the change in the size distribution, $\Delta\rho(d_p)$, caused by targets binding to the spheres' surfaces.
Figure 10B:
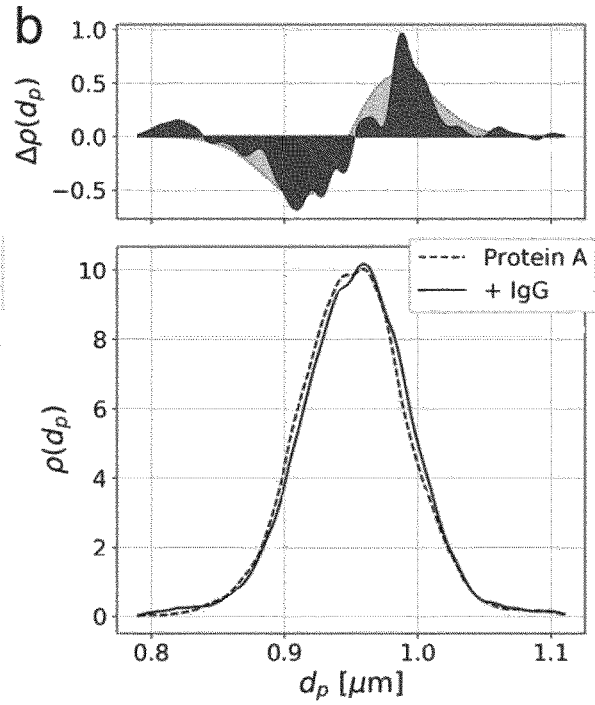
Figure 11A:
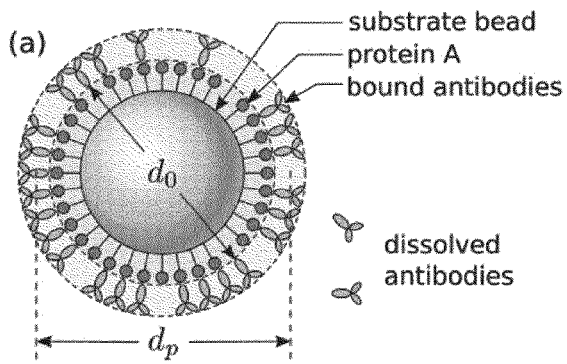
FIG. 11A is a schematic representation of a molecular binding assay based on holographic particle characterization. Probe beads consist of spherical polystyrene substrates coated with functional groups (protein A) that can bind target antibodies from solution. The probe beads have an effective diameter that increases from $d_0$ to $d_p$ when antibodies bind.
Figures 11B, 11C:
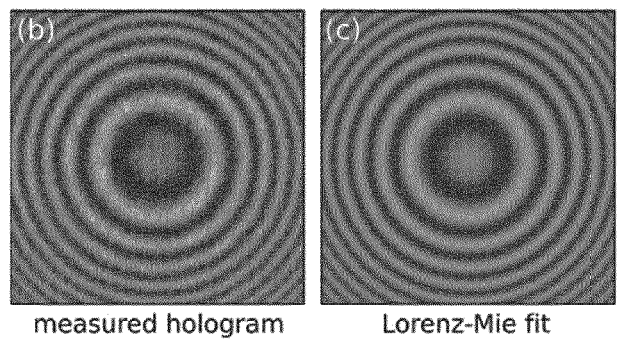
FIG. 11B shows a molecular-scale coating of antibodies influences the recorded hologram of a bead. This change can be quantified by fitting to predictions of the Lorenz-Mie theory of light scattering, yielding an estimate for the fractional surface coverage and from this the concentration of antibodies, shown in FIG. 11C.

Further, FIGS. 10A-10B show examples of holographic binding assays applied to protein binding. HPC resolves the mean particle diameter with nanometer precision, and therefore clearly detects the change in the size distribution, $\Delta\rho(d_p)$, caused by targets binding to the spheres' surfaces. FIG. 10A shows detection of the protein avidin binding to the surface of commercial biotinylated spheres. FIG. 10B shows detection of human immunoglobulin G (IgG) binding to the pathogenic surface marker, protein A.

Holographic Immunoassays

Probe bead binding sites may not be uniformly distributed over the surface of a probe bead, and all binding sites may not be filled. The space on the probe bead not covered by filled binding sites is filled with a fluid medium, having a different refractive index than the probe bead and binding molecule. Maxwell Garnett effective-medium theory is used to determine the effective diameter proportionally to the fractional coverage of bound sites.

Probe bead binding sites may not be uniformly distributed over the surface of a probe bead, and all binding sites may not be filled. The space on the probe bead not covered by filled binding sites is filled with a fluid medium, having a different refractive index than the probe bead and binding molecule. Maxwell Garnett effective-medium theory is used to determine the effective diameter proportionally to the fractional coverage of bound sites.

Experiments demonstrate quantitative holographic binding assays through measurements on antibodies binding to beads coated with protein. A, specifically immunoglobulin G (IgG) and immunoglobulin M (IgM) as example proteins in the experiments discussed below. Both of these proteins are well-studied model systems with which to validate holographic binding assays and to establish their detection limits. Given the central role of IgG and IgM in the immune response to viral pathogens, these experimental demonstrations furthermore serve as models for fast, inexpensive and quantitative serological tests.

1. Probe Beads and Buffer Solution

The probe beads used for this study (Bangs Laboratories, catalog no. CP02000, lot no. 14540) have a polystyrene core with a nominal diameter of $d_0=1$ µm and a surface layer of immobilized protein A molecules, each of which has five binding sites for the Fc region of immunoglobulins. These functionalized beads are dispersed at a concentration of $2 \times 10^6$ particles per mL in an antibody binding buffer. The same buffer is used to dissolve antibodies for testing. Equal volumes of the probe-bead dispersion and the antibody solution are mixed to initiate incubation.

The antibody binding buffer consists of 50 mM sodium borate buffer prepared with boric acid (99.5%, Sigma-Aldrich, catalog no. B0394, lot no. SLBM4465V) and NaOH (98%, Sigma-Aldrich, catalog no. S8045, lot no. 091M01421V) in deionized water (18.2 MΩcm, Barnstead Millipure). The pH of the buffer is adjusted to 8.2 with the addition of dilute HCl (38%, Sigma-Aldrich, catalog no. H1758) to optimize the binding of antibodies to protein A.

The dispersion of functionalized colloidal spheres constitutes a bead-based assay kit for immunoglobulins that bind to protein A. The same approach can be used to create specific immunoassays for particular antibodies by functionalizing the beads' surfaces with suitable antigens instead of protein A. Multiplexed assays can be produced by separately functionalizing substrate beads that can be distinguished holographically by size or by refractive index and then mixing their dispersions to make a test kit.

2. Assay Protocol

An assay is performed by dissolving target antibodies in the buffer at concentrations from 200 ng mL$^{-1}$ up to 200 µg mL$^{-1}$. Antibody solution is then mixed with an equal volume of the stock dispersion of probe beads to obtain a bead concentration of $10^6$ particles per mL and antibody concentrations in the range from 100 ng mL$^{-1}$ to 100 μg mL$^{-1}$. This easily allows for detection in a physiologically relevant range following suitable dilution, as the typical concentration of immunoglobulins in human serum is 10 mg mL$^{-1}$. The sample is allowed to equilibrate for τ=45 m at room temperature before being analyzed.

To model immunoassays that would be relevant for serological testing, assays were performed on on rabbit IgG (EMD Millipore; catalog no. PP64, lot no. 3053798) and human IgM (Sigma-Aldrich; catalog no. 18260, lot no. 069M4838V). Aggregation of IgM is suppressed by increasing the ionic strength of the buffer through the addition of 150 mM of NaCl (99.5%, Sigma-Aldrich, catalog no. S7653). Control measurements are performed by replacing the antibodies with alcohol dehydrogenase (ADH, Sigma-Aldrich; catalog no. A3263-7.5KU, lot no. SLBW31382). Non-specific binding due to incomplete coverage of the bead surfaces by protein A is blocked for these experiments by incubating the robe beads with bovine serum albumin (BSA, Sigma-Aldrich, catalog no. A2153). BSA adsorbs non-specifically to exposed polystyrene and does not interfere with antibody binding to protein A. ADH does not bind to either protein A or BSA and thus should not attach to the probe beads. With a molecular weight greater than 140 kDa, ADH is comparable in size to IgG and thus should have a similar holographic signature, were it to bind.

3. Holographic Particle Characterization

Holographic particle characterization measurements are performed with a commercial holographic particle characterization instrument (Spheryx xSight) set to record holograms at a wavelength of 447 nm. Each measurement involves pipetting a 30 μL aliquot of the dispersion into the sample reservoir of one channel in an eight-channel microfluidic chip (Spheryx xCell). The sample chip is then loaded into xSight, which is set to draw 1 μL of the sample through the observation volume in a pressure-driven flow with a peak speed of 3 mm s$^{-1}$. Data for a thousand beads is collected in measurement time Δτ=2 min and is fully analyzed in about 15 min.

The Lorenz-Mie theory used to analyze holograms treats each particle as a homogeneous sphere. When applied to inhomogeneous particles, such as the coated spheres in the present study, the extracted parameters must be interpreted as representing the properties of an effective sphere. These effective-sphere properties will differ from the physical properties of the coated sphere unless the coating has the same refractive index as the substrate bead. The refractive index of the coating, moreover, depends on the fraction, f of binding sites occupied by molecules, which means that the effective diameter of the coated sphere also depends on f Numerical studies show that the holographically measured diameter increases linearly with surface coverage:

$$d_p = d_0 + 2\delta f \qquad (3)$$

where $d_0$ is the probe sphere's diameter and d is the effective optical thickness of a complete layer of bound molecules. The value of δ depends on the size of the target molecule, the density of binding sites, and the refractive index of the target molecule relative to those of the medium and the substrate bead.

Each dispersed particle is recorded and analyzed up to 10 times as it traverses the observation volume and the resulting three-dimensional position measurements are linked into a trajectory. Dividing the length of a single-particle trajectory by the duration of the particle's transit through the observation volume yields the particle's speed, $v_p(z_p)$, as a function of its axial position, $z_p$, relative to the instrument's focal plane. The same observations also yield multiple independent measurements of the particle's diameter and refractive index that are combined to improve the precision of the estimated values.

Typical results for a sample of beads incubated with 10 μg mL$^{-1}$ of IgG are presented in FIG. 12. Each point in these scatter plots represents one particle's trajectory, FIG. 12(a), and physical properties, FIG. 12(b). The size of the dots is comparable to the estimated single-particle measurement precision.

The distribution of trajectory data in in FIG. 12(a) maps the flow field in the microfluidic channel. The individual points are colored by the spheres' measured diameters. The random distribution of colors confirms that particles are distributed uniformly throughout the channel and that particle size is not correlated with height in the channel. Fitting these data to the anticipated parabolic Poiseuille flow profile yields estimates for the positions of the upper and lower walls of the channel, which are indicated by the horizontal dashed lines in FIG. 12(a). This part of the analysis provides a useful quality control check by ensuring that the sample has flowed smoothly through the channel, that the microfluidic channel is properly seated in the instrument, and that trajectory linking has proceeded correctly.

FIG. 12(b) shows the single-particle characterization data obtained from these trajectories, with each point representing the effective diameter, $d_p$, and refractive index, $n_p$, of a single bead. Plot symbols are colored by the density of observations, $\rho(d_p, n_p)$. The 890 particles in this data set enable us to compute the population-average diameter, $d_p$= (0.974±0.002) μm, and the mean refractive index, $n_p$=1.570±0.001. These can be compared with the corresponding values for the probe beads before incubation, $d_0$=(0.964±0.002) μm and $n_0$=1.571±0.002. Although incubation with IgG appears not to have changed the beads' refractive index significantly, their mean diameter has increased by $\Delta_d = d_p - d_0 = (10\pm3)$ nm.

The values obtained for the physical properties of the beads are reasonable. The baseline value for the probe beads' mean diameter is consistent with the manufacturer's specification, 0.95 μm≤$d_0$≤1.05 μm. The value for the refractive index is significantly smaller than the value of 1.60 expected for polystyrene at the imaging wavelength, and is consistent with expectations for a coated sphere in the effective-sphere interpretation.

The uncertainties in the mean diameters, $d_p$ and $d_0$, depend on the widths of the underlying diameter distributions, which can be estimated with the standard deviation of the set of observed diameters. The precision with which the centers of those distributions can be estimated depends on the size of the statistical sample. The reported uncertainties are the computed standard deviations divided by the square root of the number of observations. Smaller uncertainties therefore can be obtained by starting with more monodisperse probe particles and by measuring more of them.

The observed increase in bead diameter is consistent with a statistically significant detection of antibody binding at concentrations two to three orders of magnitude lower than physiological levels. A principal aim of the present study is to combine the effective-sphere analysis of probe beads' holograms with the statistical physics of molecular binding to obtain quantitative information on the kinetics of antibody binding from measurements of $d_p(c,t)$. Conversely, this analysis establishes that a holographically observed shift in bead diameter can be used to measure the concentration of antibodies in solution and furthermore establishes the tradeoff between concentration sensitivity and measurement time for such holographic immunoassays.

4. Kinetics of Molecular Binding

Antibodies bind rapidly to protein A in the antibody binding buffer and the rate of dissociation is small enough for the process to be considered irreversible. Antibodies therefore continue to bind to the probe beads until all of the surface sites are saturated or the solution is depleted. Assuming that depletion may be ignored and the solution remains well mixed, the fraction of occupied sites, f(c,t), increases at a rate that depends on the concentration of antibodies, c, and the availability of unoccupied sites:

$$\frac{df}{dt} = \gamma(c)[1 + f(c, t)] \quad (4)$$

This model differs from those in previous studies by not having to account for detachment of antibodies from binding sites. Minimizing unbinding optimizes the sensitivity of the assay to small concentrations of analyte and reduces the time required to perform measurements.

The rate constant, $\gamma(c)$, accounts for the microscopic kinetics of molecular binding. Further assuming that the concentration of antibodies is low enough that binding events are independent, a model $\gamma(c)=kc$ is used in one embodiment, where k is the binding rate for the antibodies in the antibody binding buffer. The solution to eqn (4), $$f(c,t) = 1 - e^{-kct} \quad (5)$$

satisfies the initial condition f(c,0)=0 and shows that binding assays can be performed either as a function of time for fixed antibody concentration, c, or as a function of concentration at fixed incubation time, t. If, furthermore, the measurement is performed over a time interval, $\Delta\tau$, starting after incubation time $\tau$, the average coverage is $$\bar{f}(c, \tau) = \frac{1}{\Delta\tau} \int_\tau^{\tau+\Delta\tau} f(c, t) dt \quad (6a)$$

$$= 1 - \frac{1 - e^{-kc\Delta\tau}}{kc\Delta\tau} e^{-kc\tau} \quad (6b)$$

5. Monitoring Binding Holographically

Combining eqn (3) with eqn (6) yields an expression for the dependence of the measured bead diameter on the target molecules' concentration in solution:

$$\Delta_d(c, \tau) \equiv d_p - d_0 = 2\delta\left(1 - \frac{1 - e^{-kc\Delta\tau}}{kc\Delta\tau} e^{-kc\tau}\right) \quad (7)$$

Holographic measurements of $\Delta_d(c,\tau)$ at fixed incubation time $\tau$ can be interpreted with eqn (7) to estimate the effective layer thickness, $\delta$, and the rate constant, k. These values, in turn, can be used to anticipate how the sensitivity of the assay for antibody concentration depends on incubation time, $\tau$. This sensitivity can be further improved by reducing uncertainties in $\Delta_d(c,\tau)$, either by extending the measurement time to analyze more beads or by optimizing the optical properties of the beads to increase $\delta$.

Results & Discussion

Figure 13D:
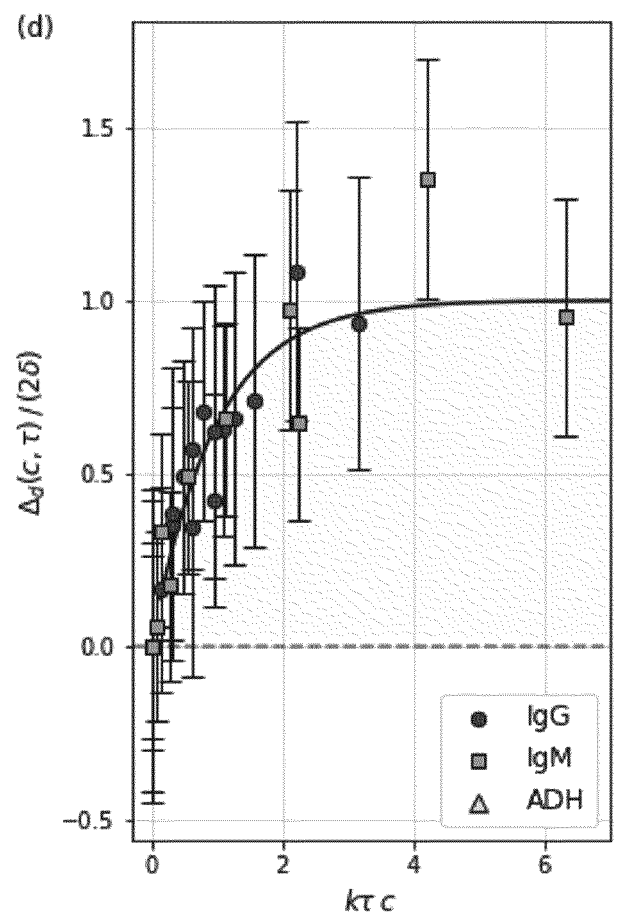
FIG. 13D Binding data collapsed according to eqn (7). Concentrations are scaled by $k_\tau$ and diameter shifts are scaled by the layer thickness, $\delta$.

The discrete points in FIGS. 13A-13C show measured shifts, $\Delta_d(c,\tau)$, in the population-average bead diameter after $\tau$=45 min incubation with IgG (FIG. 13A), IgM (FIG. 13B), and ADH (FIG. 13C). These shifts are measured in nanometers and illustrate the precision with which holographic particle characterization can resolve the diameters of probe beads. Error bars reflect uncertainties, $\sigma_\Delta$, in $\Delta_d$, obtained as the quadrature sum of the uncertainties in $d_0$ and $d_p$. Each single point represents results from roughly 1000 beads observed in 1 µL of the sample over $\Delta\tau$=2 min.

As anticipated, bead diameters increase upon incubation with antibodies by an amount that depends on antibody concentration. Incubation with ADH has no such effect, presumably because ADH does not bind to protein A. Results for IgG and ADH are presented for concentrations up to 100 µg mL$^{-1}$. IgM is plotted only up to 20 µg mL$^{-1}$ because $\Delta_d$ (c,t) reaches a plateau beyond c=5 µg mL$^{-1}$, which is interpreted to represent saturation of the available surface sites by IgM.

The threshold sensitivity is the concentration, $c_{min}$, beyond which the measured diameter increase exceeds the uncertainty, $$\Delta_d(c_{min}) \geq \sigma_\Delta \quad (8)$$

For IgG, this yields $c_{min}$=10 µg mL$^{-1}$. The corresponding threshold for IgM is $c_{min}$=1 µg mL$^{-1}$.

The solid curves in FIGS. 13A-13B are fits of the measured bead diameters to eqn (7) for the apparent layer thickness, $\delta$, and the rate constant, k. Interestingly, fits to the data for both IgG and IgM are consistent with an effective layer thickness of $\delta$=(8.0±0.5) nm even though IgM has five times the molecular weight of IgG. This agreement could be a coincidence arising from the effective-sphere interpretation of holographic imaging data. It also is consistent with a model in which multi-site binding of the predominantly pentameric IgM assembly results in a flattened orientation of the IgM on the probe beads' surfaces, thus contributing no more to $\delta$ than the single domain of IgG. This interpretation is supported by independent cryo-AFM studies that show IgM pentamers consistently lying flat upon mica surfaces, thereby forming monolayers less than 10 nm thick.

The fit value for the rate constant of IgG is $k_G$=(1.8±0.5)× 10$^3$ M$^{-1}$s$^{-1}$, given the 150 kDa molecular weight of IgG. This should be interpreted as a rate per binding site on the surface of a sphere. The value is consistent with results obtained independently with a surface acoustic waveguide device using protein A immobilized on a gold surface.

The corresponding rate constant for IgM, k $k_M$=(2.5× 0.8)×10$^5$ M$^{-1}$ s$^{-1}$, is two orders of magnitude larger, taking the mass of pentameric IgM to be 970 kDa. Naively assuming that each IgG molecules occupies $v_G$=1 binding site and each IgM occupies $v_M$=5 reduces the difference proportionately, $$\frac{k_M}{v_M} \frac{v_G}{k_G} = 28 \pm 12 \quad (9)$$

The remaining large difference in binding rates cannot be ascribed to differences in bulk transport properties because the molecules' diffusion constants are proportional to their sizes, which suggests that IgG should attach more rapidly, being smaller. It may instead reflect differences in the two antibodies' microscopic binding mechanisms. Possible explanations include differences in binding probabilities as molecules approach the surface due to the multivalent presentation of binding sites for the pentameric IgM. In addition, different barriers to attachment may arise due to variations in the nature of electrostatic interactions for immunoglobulins. A more thorough evaluation of the influence of multivalency on attachment kinetics for IgGs, IgMs and other biomacromolecules will provide an intriguing application area for holographic immunoassays. Even a simplified model such as the one-to-one binding model between protein A and IgG considered here provides a practical basis for measuring immunoglobulin concentration in solution.

Given a goal of developing rapid and inexpensive immunoassays for serological testing, the experimental results in FIGS. 13A-13d confirm that holographic particle characterization provides a basis for quantitative measurements of antibody concentrations under physiological conditions. The success of these fits to a kinetic model for attachment is demonstrated by the data collapse in FIG. 13D, with results from IgG and IgM both falling on the same master curve despite the 140-fold difference in the two antibodies' binding rate constants.

Conclusions

This study has demonstrated that holographic particle characterization can perform quantitative molecular binding assays, including measuring the rate constants that characterize molecular binding. The results demonstrate that a single 15 m measurement can quantify the concentration of IgG in solution down to concentrations as low as $10\ \mu g\ mL^{-1}$ and concentrations of IgM as low as $1\ \mu g\ mL^{-1}$. These limits are three orders of magnitude smaller than the standard physiological concentrations of $7\ mg\ mL^{-1}$ to $16\ mg\ mL^{-1}$ for IgG and $0.4\ mg\ mL^{-1}$ to $2.3\ mg\ mL^{-1}$ for IgM in healthy people. Still smaller concentrations can be monitored with longer measurements and larger statistical samples.

Whereas the IgG-protein A system has been studied extensively, less is known regarding binding of IgM to substrates coated with protein A. The holographic assays reported here provide insights into the binding mechanism that may inform future studies. IgM tends to bind significantly more rapidly to protein A than IgG. It is believed that these observations also suggest that IgM may tend to bind flat to the surface of a functionalized bead. How these trends depend on such factors as electrolyte composition and concentration fall outside the intended scope of the present study and will be addressed elsewhere.

Using protein A to provide binding functionalization yields a general-purpose assay for antibody concentration, rather than an immunoassay for specific antibodies. This general-purpose assay already should be useful as a rapid screening test for Antibody Deficiency Disorders.

Holographic immunoassays can be targeted for specific diseases by replacing protein A as a surface binding group with appropriate specific antigens, including peptides, proteins, or other biomolecules. Such functionalized colloidal spheres are standard components of conventional bead-based assays, which typically rely on fluorescent labels for readout. Holographic analysis yields results faster and at lower cost by eliminating reagents, processing steps and expertise needed to apply fluorescent labels. Holographic analysis furthermore yields quantitative results for antibody concentration without requiring extensive calibration. The speed and sensitivity of holographic immunoassays can be improved further by optimizing the sizes and optical properties of the substrate beads. Such efforts currently are under way.

Second Experimental Setup

While the above experimental examples validate the effective sphere approach, and further analyze the treatment of the coated spheres in terms of a factional coating, much more likely the result in an immunoassay, additional methods may further perfect the approach.

The effective-sphere model has been validated through studies on mesoporous spheres and fractal colloidal clusters. In both cases, the two phases that make up the particle are distributed uniformly throughout the particle's volume, which is consistent with the assumptions underlying Maxwell Garnett theory. The heterogeneity in bead-based molecular binding assays, by contrast, is restricted to thin surface layers. The present study assesses how properties of coated spheres estimated with the effective-sphere model reflect the presence and composition of such surface layers with the goal of guiding the development of fast and effective holographic molecular binding assays for research applications and medical testing.

The effective-sphere analysis of coated beads is appraised by using it to analyze synthetic holograms computed with the discrete-dipole approximation (DDA). Direct comparisons between ground truth values and fits to the effective-sphere model demonstrate that effective-sphere analysis usefully characterizes coated spheres, reliably detecting the presence of coatings and offering insights into their properties. The results of this study are consistent with trends in bead diameter and refractive index reported in experimental demonstrations of holographic molecular binding assays. This positive outcome furthermore means that molecular binding assays based on holographic particle characterization can benefit from the speed and robustness of effective-sphere analysis.

1. Holographic Particle Characterization

The holograms used for holographic particle characterization are recorded by illuminating a colloidal dispersion with a collimated laser beam. Light scattered by a colloidal particle interferes with the remainder of the beam in the focal plane of a microscope that magnifies the interference pattern and relays it to a video camera. Each magnified intensity pattern recorded by the camera is a hologram of the particles in the observation volume and encodes information on their three-dimensional positions, as well as their sizes, shapes and compositions.

Holographic particle characterization extracts information from recorded holograms by fitting to a generative model for the image-formation process. A standard implementation models the incident beam as a unit-amplitude monochromatic plane wave at frequency ω, $$E_0(r,t) = e^{ikz} e^{-i\omega t} \hat{x} \quad (10)$$

that is linearly polarized along $\hat{x}$ and propagates along $\hat{z}$. The wavenumber, $k = 2\pi n_m/\lambda$, depends on the laser's vacuum wavelength, λ, and the refractive index of the medium, $n_m$, and is related to the frequency through the standard dispersion relation, $\omega = ck$, where c is the speed of light in vacuum. This beam illuminates a particle located at $r_p$ relative to the center of the microscope's focal plane. The time-averaged intensity pattern recorded by the camera therefore may be modeled as $$b(r) = |\hat{x} + e^{-ikz_p} f_s(k(r-r_p))|^2 \quad (11)$$

where $f_s(kr)$ is the Lorenz-Mie scattering function for the particle. In practice, an experimentally recorded hologram is corrected for the dark count of the camera and normalized by the intensity distribution of the illumination to facilitate comparison with Eq. (11).

The scattering function for a homogeneous sphere is parametrized by the sphere's diameter, $d_p$, and refractive index $n_p$. Fitting a single-particle hologram to Eq. (11)

involves optimizing these two parameters plus the particle's three-dimensional position, $r_p$. Published implementations can localize and characterize a sphere in a typical video image in under 50 milliseconds on a desktop workstation.

The numerical studies are performed with parameters appropriate for the commercial xSight instrument for holographic particle characterization (Spheryx, Inc.). This platform currently is being used to develop holographic antibody binding assays of the kind depicted in FIGS. 14A-14D. It operates at a vacuum wavelength of λ=445 nm and has an effective system magnification of 120 nm/pixel. It is assumed that the medium has the refractive index of water at the imaging wavelength, $n_m$=1.340. No other calibration constants are required.

Validation experiments on colloidal size standards demonstrate that holographic particle characterization measurements, including those performed with xSight, can resolve the diameter of a micrometer-scale sphere with a precision of 5 nm. Measurements on emulsion droplets demonstrate precision and reproducibility in the refractive index of 0.001. The former should suffice to detect the formation of a molecular coating through the associated change in the bead's diameter, while the latter is useful for distinguishing different types of beads on the basis of their composition.

In principle, the hologram of a coated sphere could be analyzed by suitably generalizing the scattering function, (kr), to account for the thicknesses and refractive indexes of its coatings. Such generalizations have been applied successfully to experimental studies of polymer-shelled microbubbles and evaporating aerosol droplets. Introducing these additional adjustable parameters, however, reduces the likelihood that the fits will converge successfully and increases the measurement's sensitivity to noise and uncorrected interference artifacts in the recorded images. The extracted values for the parameters, moreover, still would reflect effective-medium characterizations of molecular overlayers that could be patchy or incomplete.

2. Testing Effective-Sphere Analysis of Coated Spheres with the Discrete-Dipole Approximation To assess how effective-sphere parameters reflect the actual properties of a coated sphere, one embodiment numerically computes the ideal hologram of a coated sphere using the discrete-dipole approximation (DDA), and then analyze the hologram using Lorenz-Mie theory for a homogeneous sphere. The DDA treats a scatterer as an ensemble of point-like dipoles. Each elementary dipole scatters the incident plane wave, redirecting a portion to the imaging plane. Some of the scattered light reaches neighboring dipoles, which scatter it a second time. Some of that twice-scattered light also reaches the imaging plane and contributes to the computed image. The first-order DDA truncates the hierarchy after the first neighbor-scattering contribution both to reduce computation time and also to maintain numerical stability.

One implementation uses the holopy interface to the ADDA library. A coated sphere is modeled, in one embodiment, by specifying the properties of the individual dipoles in a discrete three-dimensional square lattice. Dipoles located within the substrate sphere are assigned refractive indexes no. Those within coatings are assigned $n_1$ or $n_2$, as indicated in FIG. 14A. The field scattered by this system of dipoles replaces (kr) in Eq. (11) in computing the ideal hologram. The example in FIG. 14B was computed in this way.

The effective-sphere analysis is performed with the pylorenzmie software suite that automates fits to Eq. (11). The hologram in FIG. 14D depicts the effective-sphere model's best fit to the DDA hologram in FIG. 14B. Whereas the DDA hologram requires 1 min to compute, the equivalent effective-sphere hologram can be computed in under 5 ms on the same computer hardware. Given that a single nonlinear least-squares fit can require dozens of hologram computations, the speed of the effective-sphere model offers clear advantages provided that its results can be interpreted productively.

Using pylorenzmie to analyze holograms recorded by xSight commercial devices yields characterization results consistent with those reported by the instrument's own analytical software. This indicates the results of the numerical experiments reflect the performance of the effective-sphere model for real-world measurements.

The standard computational lattice employed by ADDA has $10n_0/n_m$ dipoles per wavelength, λ, along each axis. The resulting 37 nm lattice constant for the system is larger than the thickness of a typical molecular-scale coating. Dipoles representing a coating therefore are distributed in a grid across the surface of the model sphere, rather than forming a continuous layer. The spacing between the coating's dipoles still is smaller than the wavelength of light, which reduces the influence of this discreteness. ADDA further minimizes grid-mediated artifacts through interpolation. As a result, reducing the lattice spacing from the default value to 10 nm does not appreciably change results for the coated spheres' effective diameters or refractive indexes, although it increases computation time 300-fold.

3. Validating DDA and Effective-Sphere Implementations

The combination of DDA hologram synthesis and Lorenz-Mie analysis is validated by performing numerical experiments on homogeneous spheres for which Eq. (11) should be exact. In this case, fitted values for the diameter, $d_p^*$, and the refractive index, $n_p^*$, should agree with the ground-truth values, $d_p$ and $n_p$, used as inputs. FIG. 15A presents a map of the errors in the estimated diameter, $(d_{p,p})=d_p^*-d_p$, as a function of the ground-truth inputs. FIG. 15A shows corresponding results for errors in the refractive index, $(d_{p,p})=n_p^*-n_p$. The DDA and Lorenz-Mie formulations agree on the spheres' diameters to within the ±5 nm precision of holographic characterization measurements over more than half of the selected parameter range, the agreement being better than 1 nm for smaller spheres. Errors in refractive index generally are smaller than ±5 ppt across the entire domain, which also is reasonable for a practical application. Errors in both diameter and refractive index are consistent with previous reports of the performance of DDA calculations.

The discrete data points in FIGS. 15A-15B represent the properties of the micrometer-diameter polystyrene spheres that were used for reported molecular binding assays. The computational methods' errors in size and refractive index are comparable to instrumental uncertainties for the smaller of these particles, but exceed instrumental uncertainties for the larger.

4. Single Coatings

In one embodiment, reflected in the described experimental conditions, a single coating is added to a bead. The effect of adding a single coating of a homogeneous material onto a uniform substrate sphere was studied. This is a model for hologram formation by the probe beads used for holographic molecular binding assays. To facilitate comparison with recent experimental studies, the focus is on the particular case of micrometer-diameter polystyrene spheres with $d_0$=1 μm and $n_0$=1.60. The coating thickness, $a_1$, and refractive index, $n_1$, are selected at random from the range $a_1 \in [5$ nm, 20 nm] and $n_1 \in [1.4, 1.7]$. For each set of parameters, DDA is used to compute the coated sphere's hologram and then fit to the effective-sphere model for $d_p^*$ and $n_p^*$ In the special case that the coating has the same refractive index as the substrate, $n_1=n_0$, adding a coating is equivalent to increasing the diameter of the bead: $d_p^*=d_0+2a_1$. Alternatively, setting $n_1=n_m$ is equivalent to not adding a coating, which should yield $d_p^*=d_0$.

Figure 16:
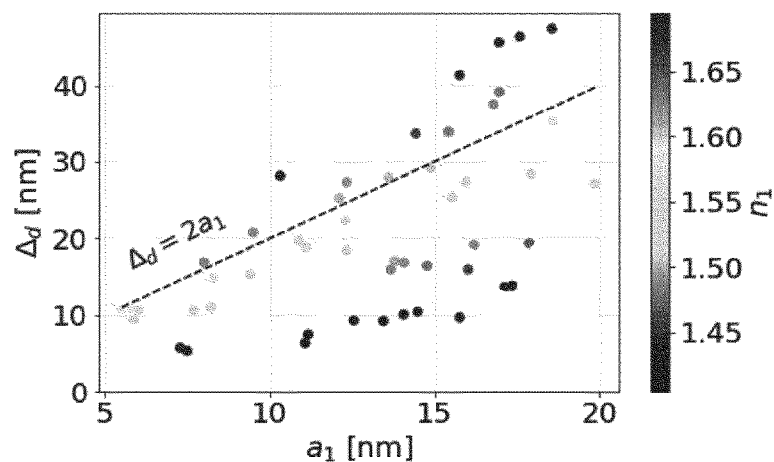
FIG. 16 shows the influence of coating thickness, $a_1$, on effective sphere diameter, $d_p^*$, depends on the refractive index of the coating, $n_1$, relative to that of the substrate sphere, $n_0$. Data points are computed for a sphere with $d_0=1$ μm and $n_0=1.60$. The observed increase, $\Delta(a_1)=d_p^*-d_0$, increases monotonically with $n_1$ and agrees with the geometric size, $\Delta_d(a_1)=2a_1$. when $n_1=n_0$, as indicated by the dashed line.
Figure 17A:
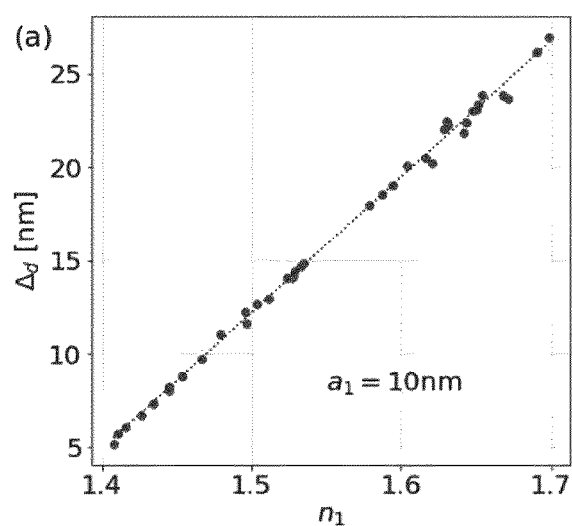
FIGS. 17A-17B show a 10 nm coating with variable refractive index $n_1$ is applied to a $d_0=1$ μm polystyrene bead and then is fitted to the effective-sphere model.

The results in FIG. 16 confirm that adding a molecular-scale coating increases the apparent diameter of the bead, $\Delta_d=d_p^*-d_0>0$, provided the coating's refractive index is greater than that of the medium. As expected, the coating's influence on the effective diameter depends on its refractive index relative to that of the substrate, with low-index coatings increasing $d_p^*$ by less than their thickness and high-index coatings increasing $d_p^*$ by more. Indeed, FIG. 17A shows that the apparent bead diameter increases nearly linearly with $n_1$ for a fixed layer thickness, $a_1=10$ nm. Extrapolating to $n_1=n_m$ yields $\Delta_d=0$, as expected. Similarly, setting $n_1=n_0$ yields $\Delta_d=2a_1$. From this, a phenomenological relationship is obtained between the effective diameter and the properties of the coating:

$$d_p^* = d_0 + 2a_1 \frac{n_1 - n_m}{n_0 - n_m} \tag{12}$$

Figure 17B:
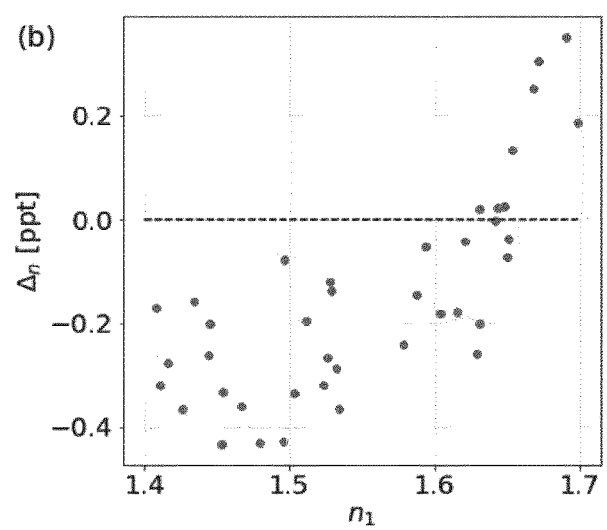

FIG. 17B shows the corresponding influence of the coating's refractive index, $n_1$, on the effective sphere's refractive index, $n_p^*$. Unlike the diameter, the change in refractive index, $\Delta_n=n_p^*-n_0$, does not depend linearly on $n_1$. Generally speaking, a low-index coating with $n_1<n_0$ reduces the bead's effective refractive index, $n_p^*<n_0$, while a high-index coating increases it. The overall magnitude of this effect is less than one part per thousand for the conditions considered, which suggests that trends in the effective refractive index are not likely to provide a practical basis for detecting and characterizing individual molecular overlayers.

5. Fractional Coverage and Partial Coatings

Binding sites may not cover the surface of a probe bead uniformly, nor need target molecules to fill all of the available binding sites. Such incomplete coverage is depicted schematically in FIG. 14A. If target molecules with refractive index $n_1$ fill a fraction, f, of the available sites, the remainder of the surface layer is filled with the fluid medium at refractive index $n_m$. The surface layer then has an effective refractive index, $n_1^*$, intermediate between $n_1$ and $n_m$ that is accounted for by Maxwell Garnett effective-medium theory:

$$L(n_1^*/n_m)=fL(n_1/n_m) \tag{13a}$$

where $$L(m) = \frac{m^2 - 1}{m^2 + 2} \tag{13b}$$

is the Lorentz-Lorenz function. From this, an expression is obtained for the effective refractive index of the partial coating $$\frac{n_1^*(f)}{n_m} = \sqrt{\frac{1 + 2fL(n_1/n_m)}{1 - fL(n_1/n_m)}} \tag{14}$$

$$\approx 1 + \frac{3}{2} fL(n_1/n_m) \text{ for } fL(n_1/n_m) < 1 \tag{15}$$

It is believed, therefore, that the measured increase in the effective diameter is roughly proportional to the fractional coverage of bound molecules.

Figure 18:
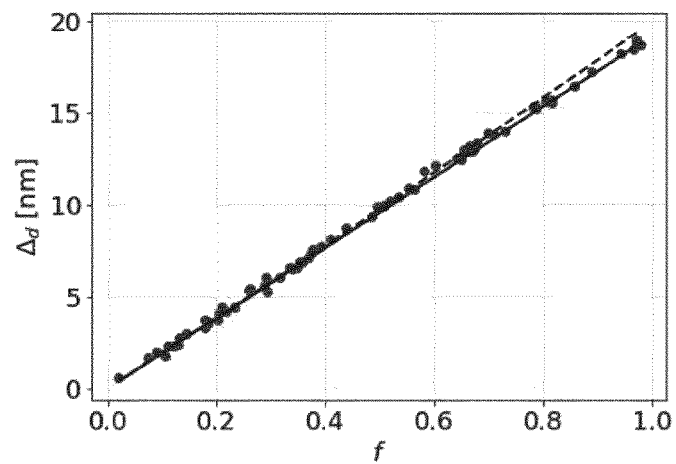
FIG. 18 shows the effective shift in diameter from the effective-sphere model, $\Delta_d$, plotted against fraction of surface coverage, f for a sphere of diameter $d_0=1$ μm and refractive index $n_0=1.60$ coated with a 10 nm-thick layer with $n_1=1.60$. Coverage fraction is computed using Maxwell Garnett effective-medium theory, with f=0 corresponding to $n_1^*=$nm and f=1 corresponding to $n_1^*=n_1$. Dashed and solid curves correspond to predictions of Eq. (9) and Eq. (10), respectively.

FIG. 18 presents the representative case of $n_1=n_0=1.6$, with a coating thickness of $a_1=10$ nm. This should be a reasonable model for a polystyrene sphere coated with a monolayer of protein. Discrete (red) data points represent results of numerical experiments for randomly selected filling fractions, ranging from a bare sphere at f=0 to a complete coating at f=1. The solid line is a comparison with the linear approximation from Eq. (8), which interestingly agrees better with the data than the dashed curve representing the full expression from Eq. (7).

6. Molecular Binding Assays: Double Coatings

The foregoing results show that the effective-sphere model reasonably models the light-scattering properties of the probe beads used for holographic molecular binding assays. In one embodiment, more than a single layer coating may be present in one or more probe beads. Experiments were tailored to address how such properties change when target molecules occupy the binding sites on the surface of a probe bead to form a second layer, as depicted in FIG. 14A.

The experiments continued to use $d_0=1$ μm and $n_0=1.6$ to model the micrometer-diameter polystyrene substrate bead used in experimental studies. Once the coating of binding sites is added, the probe beads have effective diameter $d_0^*$ and effective refractive index $n_0^*$, both of which are determined by fitting to the effective-sphere model. Adding a layer of target molecules on top of this constitutes a model for a binding assay with effective properties $d_p^*$ and $n_p^*$. The standard assay involves monitoring the difference, $\Delta d_p^*=d_p^*-d_0^*$, in the probe beads' effective diameter upon binding. The change in refractive index, $\Delta n_p^*=n_p^*-d_0^*$ is monitored.

Figure 19A:
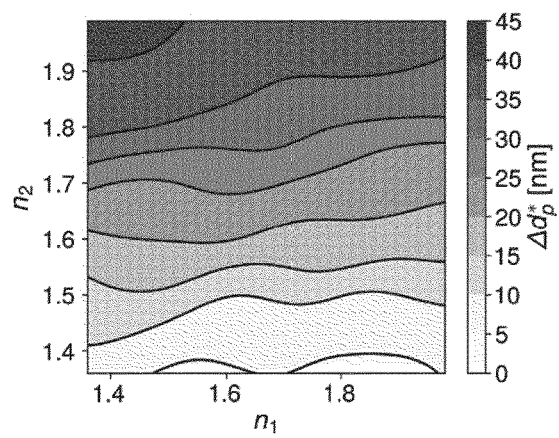
FIGS. 19A-19B show differences in effective sphere parameters between a singly-coated and doubly-coated sphere, varying values of coating effective refractive indices $n_1$ and $n_2$.
Figure 19B:
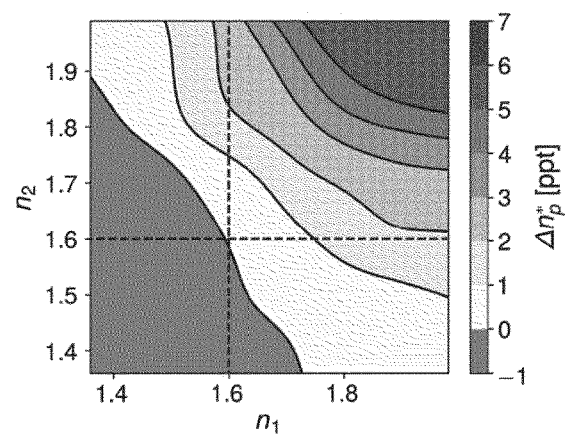

For concreteness, we choose the two coatings to have the same thickness, $a_1=a_2=10$ nm, while $n_1$ and $n_2$ are chosen at random between 1.4 and 1.7. This range of refractive indexes matches expectations for protein coatings given that the coatings may not be complete. Performing two fits to the effective-sphere model for each parameter pair ($n_1,n_2$) yields measurements of $\Delta d_p^*$ and $\Delta n_p^*$ that are presented in FIG. 19A and FIG. 19B, respectively.

Binding-induced increases in the effective diameter, $\Delta d_p^*$, are found to be largely independent of the inner coating's refractive index, $n_1$. Changes in the apparent size depend much more strongly on the refractive index of the outer coating, $n_2$. This is fortunate for practical molecular binding assays because variations in the density of binding sites might have introduced biases into holographic measurements of $d_p^*$ arising from optical effects that would have exacerbated their actual influence on the statistics of binding. The absence of such optical biases increases the reliability of measurements of the concentration of target molecules based on holographic measurements of $d_p^*$.

Binding-induced changes in the bead's refractive index are far more subtle than changes in the size. The influence of the outer coating on both the apparent size and refractive index increases as the refractive index of the coating becomes more mismatched with the refractive index of the substrate bead. These observations suggest that the sensitivity of molecular binding assays can be improved by reducing the refractive index of the substrate beads. Previous experiments have used commercial polystyrene substrate beads with relatively high refractive indexes, $n_0=1.60$. Better choices might include silica with a refractive index around $n_0=1.42$, poly(methyl methacrylate) (PMMA) with a refractive index around 1.50, and 3-(trimethoxysilyl)propyl methacrylate (TPM) with a refractive index around $n_0=1.51$.

Comparison with Experiments

Figure 20A:
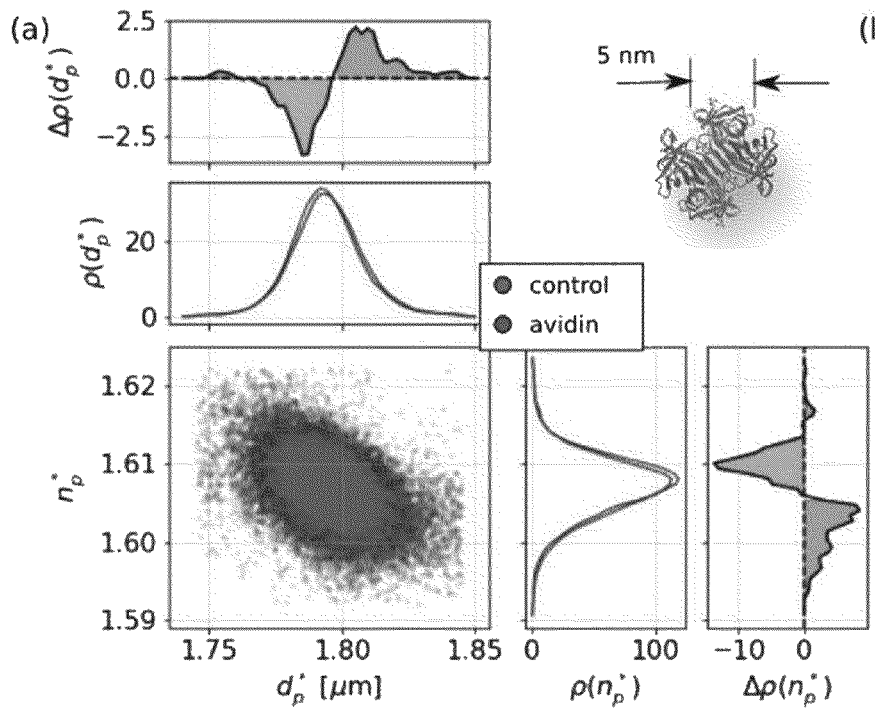
FIGS. 20A-20B show holographic particle characterization data for avidin binding to biotinylated polystyrene spheres (FIG. 20A) and IgG binding to polystyrene spheres coated with protein A (FIG. 20B). The scatter plots show the distributions of single-particle characterization results. Control data from the probe beads are colored blue. Results after binding are colored red. Each data set also shows the projected distributions of particle diameters, $(d_p^*)$, and refractive indexes, $(n_p^*)$, as well as the differences $\Delta(d_p)$ and $\Delta_p(n_p)$ in measured diameter and refractive index, respectively, caused by molecular binding. Both cases show an increase in effective diameter and a decrease in effective refractive index after binding. Insets show structures of tetrameric avidin (FIG. 20A; PDB code: 2AVI) and IgG (FIG. 20B; PDB code: 1IGT).
Figure 20B:
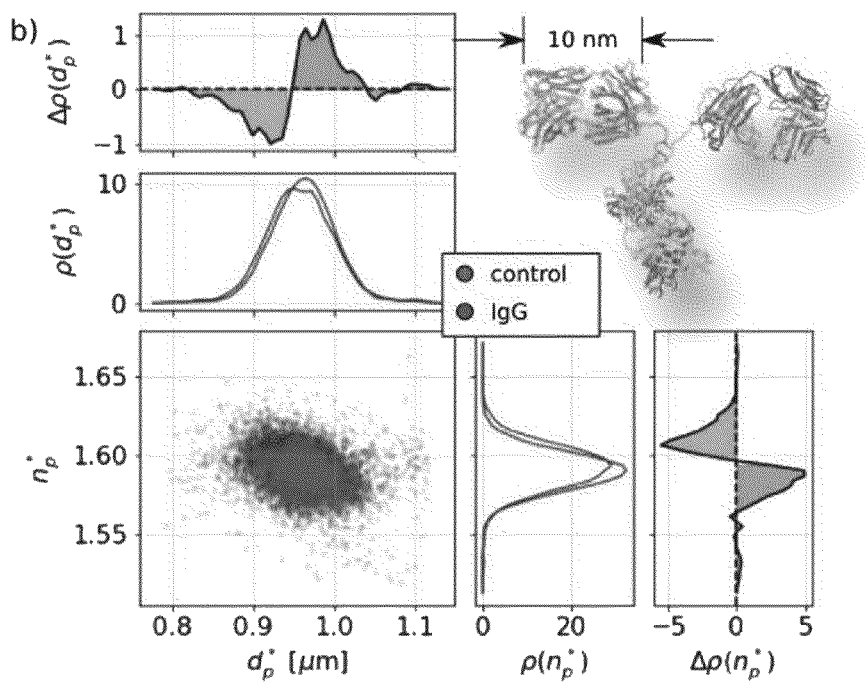

Insights gained from these numerical studies are useful for interpreting experimental realizations of holographic molecular binding assays. The data in FIGS. 20A-20B are reproduced from the above described IgG binding experiment and show how molecular binding changes effective-sphere properties in two cases: avidin binding to biotinylated polystyrene spheres (FIG. 20A) and IgG binding to polystyrene spheres coated with protein A (FIG. 20B). Each point in the scatter plot represents the measured diameter and refractive index of a single colloidal particle dispersed in a buffer containing dissolved target molecules. The dark (blue) data points represent the properties of the probe beads, $d_0^*$ and $n_0^*$, before incubation. The light (red) points represent properties of the same population of beads after incubation, $d_p^*$ and $n_p^*$. To facilitate comparisons, projected probability distributions, $(d_p^*)$ and $(n_p^*)$, of the measured diameters and refractive indexes, respectively, both before and after incubation are plotted. The differences in these distributions, $\Delta\rho(d_p^*)=\rho(d_p^*)-\rho(d_0^*)$ and $\Delta\rho(n_p^*)=\rho(n_p^*)-\rho(n_0^*)$, emphasize shifts in the distributions due to incubation with target molecules.

The biotinylated probe spheres have a mean diameter of $d_0^*=1.7935(4)$ μm. This increases to $d_p^*=1.7956(5)$ μm after tetrameric avidin binds to the beads. Confidence intervals for these values represent the uncertainty in the mean of more than 15000 particles in each data set and therefore are much smaller than the uncertainty in a single-bead measurement. The observed shift of $\Delta d_p^*=1.1(1)$ nm is smaller than the 5 nm domain size of avidin. Whereas the beads' diameter increases upon binding, their measured refractive indexes decrease from $n_0^*=1.60730(3)$ to $n_p^*=1.60693(3)$, a net change of $\Delta n_p^*=(-0.374\pm0.04)$ ppt. The probe beads' refractive index is consistent with expectations for polystyrene, presumably because biotin is a small molecule; a coating of biotin therefore does not substantially affect the substrate beads' light-scattering properties.

The protein A-coated spheres have a mean diameter of $d_0^*=0.9573(8)$ μm before incubation with the antibody IgG. This increases to $d_p^*=0.9622(6)$ μm after 45 min incubation resulting in a shift of $\Delta d_p^*=4.9(10)$ nm. This increase is larger than was observed for the avidin-biotin system presumably because IgG is substantially larger than tetrameric avidin. Once again, however, $\Delta d_p^*$ is much smaller than the size of the target molecule. Uncertainties are larger in this case because the statistical ensemble consists of only 3000 particles per sample.

As for the biotin-avidin system, binding IgG causes the probe beads' refractive index to shift downward from $n_0^*=1.5926(3)$ before binding to $n_p^*=1.5897(2)$ after, a decrease of $\Delta n_p^*=(-2.9\pm0.3)$ ppt. The initial refractive index of the protein A coated probe beads is smaller than expectations for polystyrene presumably because of the influence of the protein. Protein A is nearly as large as tetrameric avidin and might be expected to have a comparably sizable influence.

In both cases, binding with target molecules leads to an increase in the holographically measured particle diameter that is smaller than the physical size of the target molecules and a decrease in the measured refractive index. Looking to the results in FIGS. 19A-19B, these trends can be explained if the coatings of bound molecules have lower refractive indexes than the effective refractive index of the substrate beads. Specifically, it is believed that these results to show that both avidin and IgG have refractive indexes substantially smaller than 1.6 at the densities of the experimentally obtained coatings. Choosing substrate beads with lower refractive indexes therefore should increase the apparent shift in bead diameter upon binding thereby increasing the target molecules' influence on holographically measurable properties and improving the sensitivity of the assay.

Conclusions

The discrete-dipole approximation was used in one embodiment to model label-free bead-based molecular binding assays performed with holographic particle characterization in the effective-sphere approximation. A computational study confirms that interpreting the holograms of coated spheres with the Lorenz-Mie theory for homogeneous spheres yields valuable information on the presence and characteristics of the coatings while retaining the demonstrated speed and robustness of standard holographic particle characterization. These results also validate the prior experimental results described above and explains trends in those measurements as arising from the mismatch in refractive index between the substrate beads and the molecular coatings. Because this mismatch depends on the filling factor, f, of bound molecules on the beads' surfaces, the particles' effective diameters and refractive indexes change continuously as binding proceeds. Results have shown that changes in the diameter scale linearly with f to a very good approximation. This means that trends in the holographically measured diameter can be mapped directly onto trends in the fraction of filled binding sites.

The results furthermore provide guidance for optimizing holographic molecular binding assays. Most notably, the sensitivity of such assays to variations in the filling factor can be increased by reducing the refractive index of the substrate beads. The polystyrene substrates used for many standard bead-based assays are not the best choice for this application, therefore, because their refractive index is quite high. Other materials such as silica, PMMA and TPM offer attractive alternatives for such assays. Ultra-low-index fluorinated PMMA spheres might be a particularly good choice. The choice of substrate for holographic molecular binding assays therefore can be optimized both for optical properties and also for physical properties such as buoyancy to facilitate processing of tests. Beads of different sizes and compositions can be functionalized with different binding sites and combined into a multiplexed assay. The individual tests can be monitored in parallel through the unique ability of holographic particle characterization to differentiate particles by both size and refractive index. These considerations should be particularly useful for designing serological and diagnostic tests for viral infection, with immediate urgency being placed on addressing the ongoing COVID-19 pandemic.

Definitions and Alternative Embodiments

The foregoing description of embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principles of the invention and its practical application to enable one skilled in the art to utilize the invention in various embodiments and with various modifications as are suited to the particular use contemplated.

What is claimed is:

1. A method of characterizing a parameter of a viral protein by holographic microscopy, comprising the steps of:
   receiving holographic image data having a set of concentric bright and dark rings associated with a functionalized probe bead;
   determining by Lorenz-Mie analysis an effective sphere estimate of each of the functionalized probe bead's effective sphere diameter, and effective sphere refractive index; and
   determining a diameter difference between the effective sphere diameter with a predetermined diameter for unbound functionalized probe beads, with diameter difference representing the result of material bound to the bead and medium within the effective sphere estimate, wherein the effective sphere diameter ($d_p$) is equal to $$d_p = d_0 + 2\delta f$$

wherein $d_p$ is the effective sphere diameter, $d_0$ is the predetermined diameter for unbound functionalized probe beads, $\delta$ is effective optical thickness of a complete layer of the viral protein, and f is the fraction of binding sites on the functionalized probe bead.

2. The method of claim 1, wherein the material is a protein associated with SARS-CoV-2.

3. The method of claim 1, determining by Maxwell Garnet effective-medium theory the effective diameter of the probe bead, and effective refractive index.

4. The method as defined in claim 1 wherein an associated plurality of holograms are formed by interaction between the sample and the plurality of wavelengths of coherent light, thereby enabling determination of different responses of the sample to the different wavelengths of coherent light and analyzing the different response to identify the parameters of the sample.

5. The method as defined in claim 1 wherein determining the centroid further includes determining the Lorenz-Mie functionality scattering function $f_s(kr)$ along a line segment $R = |r - r_p|$ and interpolating to obtain a function $f_s(k(r - r_p))$ thereby reducing processing time and providing real time analysis of the sample.

6. The method as defined in claim 1 further including the steps of performing the Lorenz-Mie analysis and obtaining comparisons between of the image data a particle being in an untreated state and another particle having undergone a treatment, thereby enabling real time characterization of molecular layers present on the treated particle versus the untreated particle.

7. The method as defined in claim 6 wherein the real time characteristics are selected from the group of index of refraction and particle radius.

8. The method as defined in claim 1 further including the step of estimating in-plane co-ordinates of the particle by the Lorenz-Mie analysis and then estimating axial coordinate of the particle by back-propagating the measured light field applying a Rayleigh-Sommerfeld propagator.

9. The method as defined in claim 1 wherein the analysis step includes applying a Levenburg-Marquardt fitting routine to identify the in-plane co-ordinate within 3 nm.

10. The method as defined in claim 1 further including the steps of determining velocity of the particle in a flowing form.

11. The method as defined in claim 10 further including the step of mapping a three-dimensional flow field of the particle.

12. The method as defined in claim 10 wherein the step of analyzing the information comprises simultaneously tracking and characterizing individual ones of the particles.

13. The method as defined in claim 1 wherein the step of measuring includes identifying molecular-scale coatings on functionalized forms of the particle by detecting variations in apparent increase in radius.

14. The method as defined in claim 13 wherein the coatings are associated with the bind proteins of SARS-CoV-2.

15. The method as defined in claim 13 wherein partial coatings are filled with a fluid medium.

16. A system for characterizing a parameter of a sample by holographic microscopy, comprising:
    a holographic microscope including a laser beam source and an objective lens, the laser beam positioned to interact with a fluidic sample channel having media, probe beads, and target objects, scattering from the sample comprising probe beads having target objects bound to a surface and interacting with an unscattered portion of the laser beam to provide a holographic scattering pattern,
    an image collection device for collecting image data characteristic of the scattering pattern from the holographic microscope; and,
    a computer system including a processor and memory, the memory having stored thereon computer readable instructions, the computer readable instructions configured to:
    receive holographic image data of the sample;
    determine a first estimate of the number of coated probe beads in the holographic image data, each object associated with a set of concentric bright and dark rings;
    determine, for each set of concentric bright and dark rings a centroid defined by an approximate x, y position in a plane, with each pixel of the image data voting for pixels in a transformed image that may be centroids;
    determine an estimate of the axial position (z) of each of the coated probe beads;
    determine by Lorenz-Mie analysis an estimate of each of the coated probe beads effective sphere radius and effective sphere refractive index, where each coated probe bead is treated as an effective sphere for Lorenz-Mie analysis;
    determine by Maxwell Garneet effective-medium theory the effective coating diameter, and effective coating refractive index, an effective coating comprising bound target objects and media within an associated effective sphere;
    compare one of the radius and refractive index for each of the objects the same of radius or refractive index of a control sample; and
    determine for each one of the objects if that one object is bound to a material relative to the control sample.

17. The system of claim 16, wherein the holographic microscope includes a plurality of laser beams corresponding to multiple wavelengths and wherein the computer readable memory is configured to receive multi-color holographic image data.

18. The system as described in claim 17 wherein each of the plurality of laser beams are configured to engage a microfluidic channel having the plurality of particles.

19. A method of characterizing parameters for holographic microscopy of objects comprising the steps of:

receiving, by a processor, image data from a storage medium;

transforming, by a processor, the image data using a Hough circular transform to determine by a voting algorithm a first estimate of the number of objects in the image data and the objects approximate x, y position in a plane;

applying, by a processor, Lorenz-Mie analysis of the image data for each of the objects to determine an estimate of the radius and refractive index of each of the objects;

applying, by a processor, Maxwell Garnett effective-medium theory analysis of the image data for each of the objects to determine the effective diameter of a coating associated with the object;

identifying, by a processor, from one or both of estimated radii and estimated refractive indices those particles having a coating; and generating a signal to the user indicating completed process.

20. The method of claim 19, wherein the determination of a centroid is by application of a circular Hough transformation wherein each pixel in an original image votes for the pixels in a transformed image.

* * * * *